(12) United States Patent
Cardentey

(10) Patent No.: US 10,913,479 B1
(45) Date of Patent: Feb. 9, 2021

(54) MOTORIZED STROLLER ACCESSORY

(71) Applicant: Eddy Cardentey, Mars, PA (US)

(72) Inventor: Eddy Cardentey, Mars, PA (US)

( * ) Notice: Subject to any disclaimer, the term of this patent is extended or adjusted under 35 U.S.C. 154(b) by 0 days.

(21) Appl. No.: 16/424,560

(22) Filed: May 29, 2019

Related U.S. Application Data

(60) Provisional application No. 62/680,864, filed on Jun. 5, 2018, provisional application No. 62/687,375, filed on Jun. 20, 2018, provisional application No. 62/814,898, filed on Mar. 7, 2019.

(51) Int. Cl.
B62B 9/00 (2006.01)
B62B 7/04 (2006.01)

(52) U.S. Cl.
CPC ............... *B62B 9/00* (2013.01); *B62B 7/042* (2013.01)

(58) Field of Classification Search
CPC .................................. B62B 9/00; B62B 7/042
See application file for complete search history.

(56) References Cited

U.S. PATENT DOCUMENTS

| 2,919,756 | A  | * | 1/1960  | Knipe ............... A01D 34/64 180/11 |
| 6,148,942 | A  |   | 11/2000 | Mackert, Sr. |
| 6,360,836 | B1 | * | 3/2002  | Milano, Jr. ............ B62B 5/005 180/65.6 |
| 6,827,356 | B2 | * | 12/2004 | Zhuang ............... B62B 9/28 280/304.1 |
| 6,871,714 | B2 | * | 3/2005  | Johnson ............... A61G 7/08 180/19.2 |
| 7,219,754 | B2 | * | 5/2007  | Johnson ............... A61G 7/08 180/19.2 |
| 7,226,059 | B1 | * | 6/2007  | Samuels ................ B62B 3/027 280/33.991 |
| 7,600,764 | B1 | * | 10/2009 | Parker ................... B62B 5/068 280/416 |
| 7,735,587 | B1 | * | 6/2010  | Stahlnecker ............. B62B 1/12 180/11 |
| 7,971,884 | B2 | * | 7/2011  | Lundh ..................... B62B 9/28 280/32.7 |
| 8,033,348 | B1 | * | 10/2011 | Parkhe ..................... B62B 9/00 180/19.1 |
| 8,276,922 | B2 | * | 10/2012 | Lai ........................... B62B 9/28 280/32.7 |
| 8,322,740 | B1 | * | 12/2012 | Visconti ................... B62K 5/00 280/221 |
| 9,321,475 | B2 | * | 4/2016  | Weber ...................... B62B 9/28 |
| 9,656,682 | B2 |   | 5/2017  | Ahlemeier |

(Continued)

FOREIGN PATENT DOCUMENTS

KR           101822327 B1       1/2018

OTHER PUBLICATIONS

KIPO (Mechanical) English Translation of KR101822327.

*Primary Examiner* — Bryan A Evans
(74) *Attorney, Agent, or Firm* — Thomas M. Joseph, Esq

(57) ABSTRACT

A wheeled platform has a base, a plurality of wheels, and a power supply. A connector extends from the wheeled platform. A motor assembly has at least one motor mounted on the connector to couple with a stroller. A controller assembly steers the stroller. The base includes an upper surface for supporting an operator. The base forms a wheel assembly for holding the wheels. The power supply sends power to the motor assembly through the control assembly to drive the stroller.

20 Claims, 17 Drawing Sheets

(56) References Cited

U.S. PATENT DOCUMENTS

| | | | | |
|---|---|---|---|---|
| 9,744,095 B1* | 8/2017 | Mazzei | ............... | A61H 3/04 |
| 9,796,401 B1* | 10/2017 | Ammirati | ............ | B62B 5/0053 |
| 10,137,921 B2* | 11/2018 | Lee | ............... | B62B 9/00 |
| 10,285,894 B1* | 5/2019 | Haenel | ............... | A61H 3/04 |
| 10,286,977 B1* | 5/2019 | Haenel | ............... | B62K 27/14 |
| 2003/0025304 A1* | 2/2003 | Haeggberg | ............... | B62B 9/28 |
| | | | | 280/656 |
| 2005/0279536 A1 | 12/2005 | Nguyen | | |
| 2007/0090619 A1* | 4/2007 | Lundh | ............... | B62B 9/12 |
| | | | | 280/63 |
| 2007/0114738 A1* | 5/2007 | Jones | ............... | B62B 9/28 |
| | | | | 280/32.7 |
| 2008/0001370 A1* | 1/2008 | Cousin | ............... | B62B 9/28 |
| | | | | 280/32.7 |
| 2009/0267322 A1* | 10/2009 | Holtan | ............... | B62B 3/008 |
| | | | | 280/478.1 |
| 2010/0109270 A1* | 5/2010 | Hei | ............... | B62B 9/28 |
| | | | | 280/47.35 |
| 2012/0199716 A1* | 8/2012 | Youngblood | ............... | B62B 5/0016 |
| | | | | 248/316.1 |
| 2015/0144411 A1* | 5/2015 | Washington | ............... | B62B 5/0033 |
| | | | | 180/167 |
| 2015/0175185 A1* | 6/2015 | Thorpe | ............... | B62B 3/027 |
| | | | | 280/491.1 |
| 2019/0084605 A1* | 3/2019 | Berendzen | ............... | B62B 7/042 |

* cited by examiner

MOTORIZED STROLLER ACCESSORY

CROSS REFERENCE TO RELATED APPLICATION

This application claims the benefit under 35 U.S.C. § 119(e) of U.S. Provisional Application No. 62/680,864 entitled "MOTORIZED STROLLER ACCESSORY" filed Jun. 5, 2018, U.S. Provisional Application No. 62/687,375 entitled "MOTORIZED STROLLER ACCESSORY" filed Jun. 20, 2018, and U.S. Provisional Application No. 62/814,898 entitled "MOTORIZED STROLLER ACCESSORY" filed Mar. 7, 2019, which are incorporated herein by reference.

BACKGROUND

Many products are designed to assist caregivers with infants and young children. Such products include strollers, which represent one of the most common and useful products for providing such assistance. A stroller can best be described as a wheeled folding carriage designed as a chair in which an infant can be manually pushed. Conventional strollers are designed for use with newborns, infants, toddlers, and small children up to five years of age or older.

Strollers can provide a mode of transportation for children, so that parents can exercise or otherwise move about while keeping their children nearby. Strollers also alleviate the fatigue that can result from carrying children. The stroller does a great job of enabling the caregiver to take the child along for various outings without being required to constantly carry the child. The stroller also prevents the child from wandering off during shopping trips, at amusement parks, or anywhere the parent or care provider typically walks. Conventional stroller designs require the operator to push the stroller while walking or running.

The fact that the stroller must be moved around, physically, by the caregiver is a drawback with conventional strollers. Indeed, manually pushing a stroller for an extended period of time can be tiresome, especially when used in crowded shopping malls or amusement parks. Moreover, child care items, blankets, extra clothes, food, and the like can be transported in a stroller, so that the easy task of pushing the stroller can become quite daunting, especially over long periods of time or distances. Additionally, strollers are often pushed up very steep inclines and are pushed all day long on an almost daily basis; it is easy to see how pushing a stroller alone can tire the caregiver out.

Many types of power driven conveyances, such as power driven wheelchairs, are known. Such conveyances include drive motors that can be adapted for use in strollers to overcome the known disadvantages of strollers. For example, a motorized add-on can be inserted into the frame and wheel assemblies of conventional strollers. While these drive assembly add-ons can provide a means of push assistance to a stroller, they have distinct disadvantages as well, such as the inability to steer the stroller in some cases. Accordingly, there exists a need for an improved means by which mechanical assistance can be provided to a user of a stroller when needed and the physical effort required to move a stroller can be reduced.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a wheeled platform has a base, a plurality of wheels, and a power supply. A connector extends from the wheeled platform. A motor assembly has at least one motor mounted on the connector to couple with a stroller. A controller assembly steers the stroller. The base includes an upper surface for supporting an operator. The base forms a wheel assembly for holding the wheels. The power supply sends power to the motor assembly through the control assembly to drive the stroller.

In other implementations, a method for operating a wheeled platform having an interface extending therefrom is provided. The interface is connected to a stroller. An operator is supported on an upper surface of the wheeled platform. At least one motor is coupled to the stroller. Power is sent from a power supply to the at least one motor to drive the stroller.

In yet other implementations, supporting means support an operator. Connecting means connect the supporting means to a stroller. Driving means drive the stroller. Powering means power the driving means. Controlling means steer the stroller. Driving means are mounted on connecting means to couple with the stroller.

In other implementations, a kit includes a wheeled platform having a base, a plurality of wheels, and a power supply. A connector is provided for connecting to and extending from the wheeled platform. A motor assembly has at least one motor for mounting on the connector to couple with a stroller. A controller assembly is coupled with the wheeled platform. The base includes an upper surface for supporting an operator. The base forms a wheel assembly for holding the wheels.

In yet other implementations, an apparatus for interfacing with a stroller, the apparatus includes a wheeled platform having a base, a plurality of wheels, and a power supply, a connector extending from the wheeled platform, and a controller assembly for steering the stroller. The base includes an upper surface for supporting an operator. The base forms a wheel assembly for holding the wheels. The plurality of wheels includes at least one omnidirectional wheel to drive the stroller.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

Figure 1:
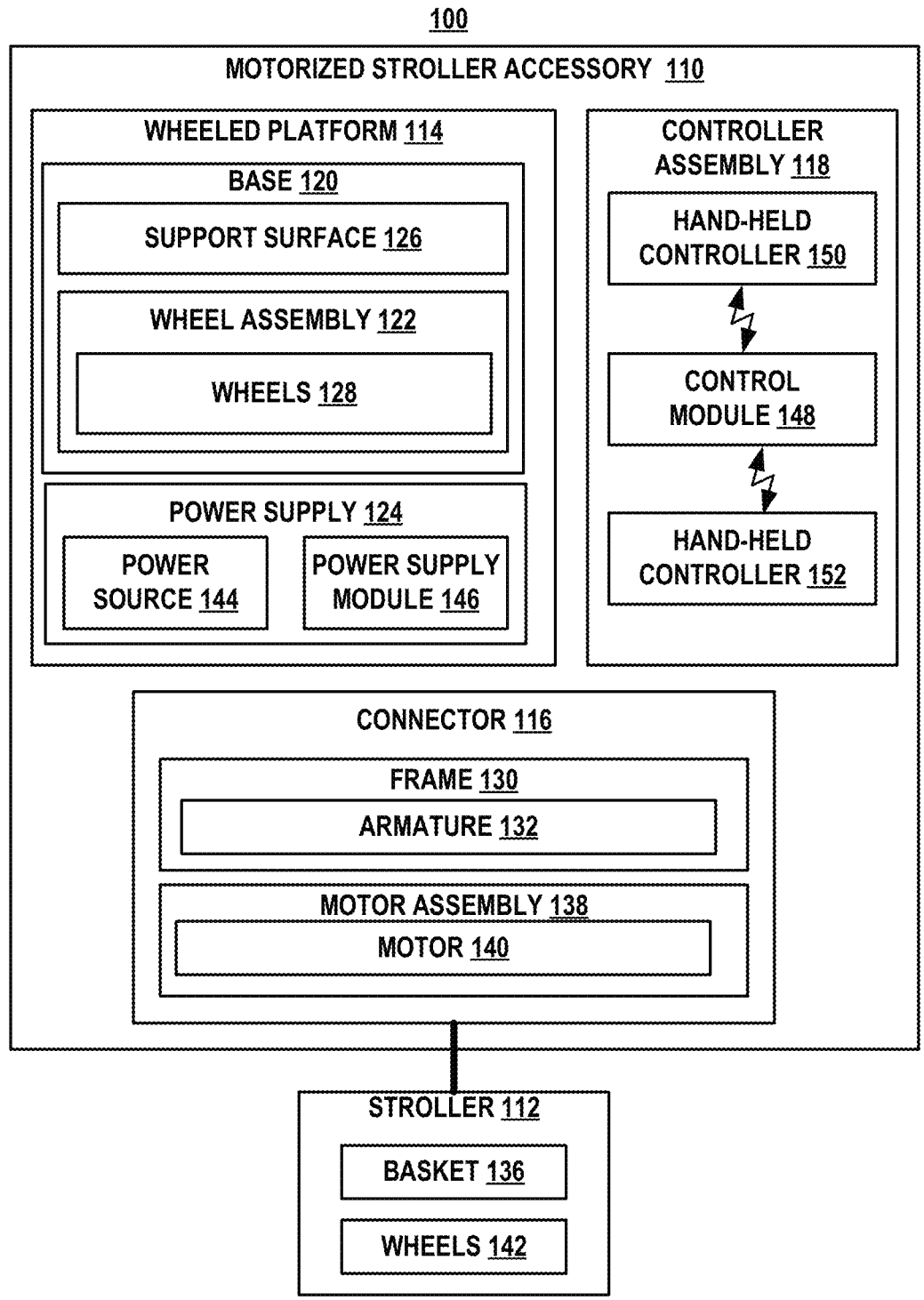
FIG. 1 is a block diagram of a motorized stroller accessory system in accordance with the present disclosure.

The subject disclosure is directed to new and improved baby strollers and carriages. More specifically, the subject disclosure is directed to a motorized accessory that aids in propelling, stopping and steering the stroller while simultaneously carrying an operator. These new and improved baby stroller accessories reduce or eliminate the physical fatigue associated with conventional strollers. Moreover, the subject disclosure represents an improvement over powered strollers because these new and improved stroller accessories can transport the operator with the stroller.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter, The disclosed subject matter is directed to a motorized operator platform accessory that functions as an after-market system that is designed to interface with a stroller in order to mobilize and control the stroller. The motorized operator platform accessory has the ability to couple with the stroller to carry the stroller operator while driving the stroller.

The system includes a rolling operator platform on swiveling wheels, a coupling frame to connect the platform to the stroller, a set of electric motors to transfer torque to the stroller rear wheels, a power system, and a control system. The coupling frame connects the operator platform to the stroller in a horizontally rigid non-swiveling manner so as to allow for operation of the stroller in reverse when necessary.

Referring now to FIG. 1, there is shown a motorized stroller accessory system, generally designated by the numeral 100, that can transport a user/operator (not shown). The motorized stroller accessory system 100 is self-propelled and includes a motorized stroller accessory 110 coupled to a stroller 112. The motorized stroller accessory 110 is powered to drive the stroller 112 while supporting the user-operator, so that the user-operator expends less energy while transporting an infant (not shown) in the stroller 112.

The motorized stroller accessory 110 includes a wheeled platform 114, a connector 116, and a controller assembly 118. The wheeled platform 114 can support and transport the user-operator, while providing power for the connector 116 and the controller assembly 118. The connector 116 couples the motorized stroller accessory 110 to the stroller 112 to function as a coupling frame. The connector 116 can connect the wheeled platform 114 to the stroller 112 in a horizontally rigid non-swiveling manner so as to allow for operation of the stroller 112 in reverse when necessary. The controller assembly 118 can provide the user-operator with the ability to steer the motorized stroller accessory system 100 and stroller 112.

The wheeled platform 114 has a base 120, a wheel assembly 122, and a power supply 124. The base 120 has an upper surface 126 that supports the user-operator while the motorized stroller accessory 110 is coupled to the stroller 112 and propels the stroller 112 in a desired direction. The base upper surface 126 includes a coating that has a high coefficient of friction to engage the user-operator frictionally.

The wheel assembly 122 includes a plurality of wheels 128 mounted within the wheeled platform 114. The wheel assembly 122 can be integral with the base 120, so that that the plurality of wheels 128 are mounted within the base 120. The wheels 128 are generally circular in shape but can be any shape or size. In some embodiments, the plurality of wheels 128 are mounted within the wheel assembly 122 to swivel for improved maneuverability. In such embodiments, the wheeled platform 114 swivels vertically to allow for the motorized stroller accessory system 100 to adapt to undulations in the terrain.

The wheel assembly 122 can be supported by three or more wheels 128. In some embodiments, eight wheels 128 can support the wheel assembly 122 to improve the maneuverability of the wheeled platform 114 over uneven or rough surfaces. In some embodiments, the wheels 128 include a rim, a hub, and spokes.

The wheel assembly 122 can include a suspension system to stabilize the wheeled platform 114. For example, the suspension system can allow one of the wheels 128 to move independently from the other wheels 128. The suspension system can help absorb vibration and shock from a surface, thus contributing to the handling of a user/operator. The wheels 128 be comprised of any suitable material, such as rubber or plastic.

The stroller 112, the wheeled platform 114, and the connector 116 can be constructed from rigid, semi-rigid, or flexible components, and/or from combinations of rigid, semi-rigid, and flexible components. The stroller 112, the wheeled platform 114, and the connector 116 can be made from any suitable material through any suitable manufacturing method. Suitable materials include metals, ceramics, plastics, and composites.

It should be understood that each component of the invention, individual components of the present invention can be made of a material that is specifically suited for the individual structural tolerances. Any combination of material or a uniform application of a single material that results in an acceptably robust structure is suitable. In this exemplary embodiment, the base 120 can support an adult human having a maximum weight of between 200 and 300 pounds, but it is contemplated that the maximum weight can be greater than 300 pounds or less than 200 pounds. The stroller 112 can be constructed to carry an infant, a toddler, or a small child.

The motorized stroller accessory 110 can be sold as an after-market item, as an accessory, or packaged with a stroller 112 as a complete system. The motorized stroller assembly 110 can be sold as a fully-assembled, turn-key device, partially assembled, or as a kit of components for assembly by the ultimate consumer.

As shown in FIG. 1, the connector 116 extends from the wheeled platform 114 to couple the motorized stroller accessory 110 to the stroller 112. The connector 116 can function as an interface between the wheeled platform 114 and the stroller 112, so that the motorized stroller accessory 110 and the stroller 112 function as a unit or coupled system. The connector 116 can include a frame 130 that connects to the stroller 112. The frame 130 can include an armature 132 that extends from the wheeled platform 114 to the stroller 112. In some embodiments, the connector 116 connects to the stroller 112 to in a horizontally rigid, non-swiveling manner so as to allow for operation of the stroller 112 in reverse when necessary. The rigid connection can provide the ability to safely slow down or stop the stroller 112 when necessary.

In some embodiments, the armature 132 can be rigid and can be mounted on the connector frame 130 for movement in a vertical direction. In such embodiments, the armature 132 can have the ability to move in a horizontal direction or can only move in the vertical direction. In other embodiments, the armature 132 can be mounted for movement in a vertical direction only. Additionally, the stroller 112 can include a bottom basket 136 for storing the armature 134 therein when the motorized stroller accessory 110 is decoupled from the stroller 112.

Similarly, the stroller accessory 110 can be stored by swiveling the armature 132 along the axis of the rear stroller wheels 142 and at the connection between the armature 132 and the wheeled platform 114. In such embodiments, the stroller accessory 110 can be folded for storage in the bottom basket 136 without further disassembly, particularly when the power source 124 needs to be recharged.

The connector 116 can include a motor assembly 138 mounted thereon. The motor assembly 138 can include at least one motor 140 mounted on the connector 116 to couple with the stroller 112. The motor 140 can provide torque to a set of wheels 142 to move the stroller 112. In some embodiments, the motor 140 can be an electric motor, such as a DC motor.

The motor assembly 138 can include a plurality of independently-controlled DC motors mounted on the connector frame 130 to rotate the wheels 142. In other embodiments, the motor 140 can include at least one motor shaft connected to sheaves, such as small radius flat sheaves or curved sheaves. The sheaves can be coated with a material having a high coefficient of friction. Alternatively, the motor assembly 138 can include other means of transferring torque to the wheels 142, including alternative drive mechanisms, drive belt configurations, or hub motors. In some embodiments, the drive mechanism can include belts that surround and cover stroller tires in a configuration that is similar to tank tracks.

The motor assembly 138 can be coupled to the power supply 124. The power supply 124 can be mounted on the wheeled platform 114 and can include a power supply module 144 and a power source 146. The power supply module 130 and the power source 146 can be mounted under the wheeled platform base 120. The power supply module 144 and/or the power source 146 can be connected to the controller assembly 118 to supply power to the motor 140. In some embodiments, the power source 146 can be a portable power supply that includes one or more batteries.

The controller assembly 118 can steer and drive the motorized stroller accessory system 100 and stroller 112 by independent control of the stroller wheels 142. The controller assembly 118 includes a control module 148 and a pair of hand held controllers 150-152. The control module 148 can be positioned under the base 120. The motor 140 can be connected to a control module 148 within the controller assembly 118. The pair of hand-held controls 150-152 can communicate with the control module 148 either wired or wirelessly.

Figure 2:
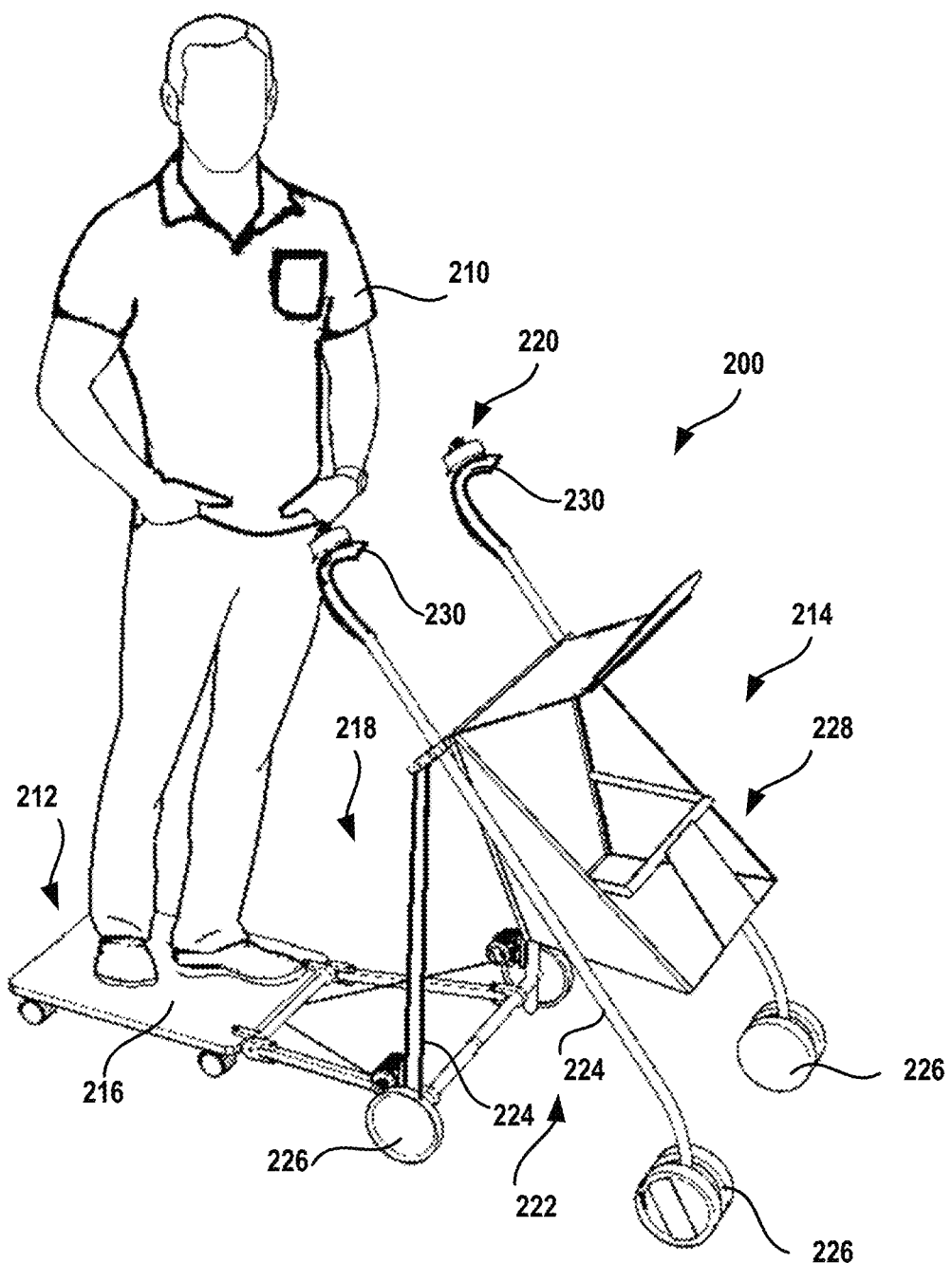
FIG. 2 is a perspective view of a motorized stroller accessory system in accordance with the present disclosure.
Figure 3:
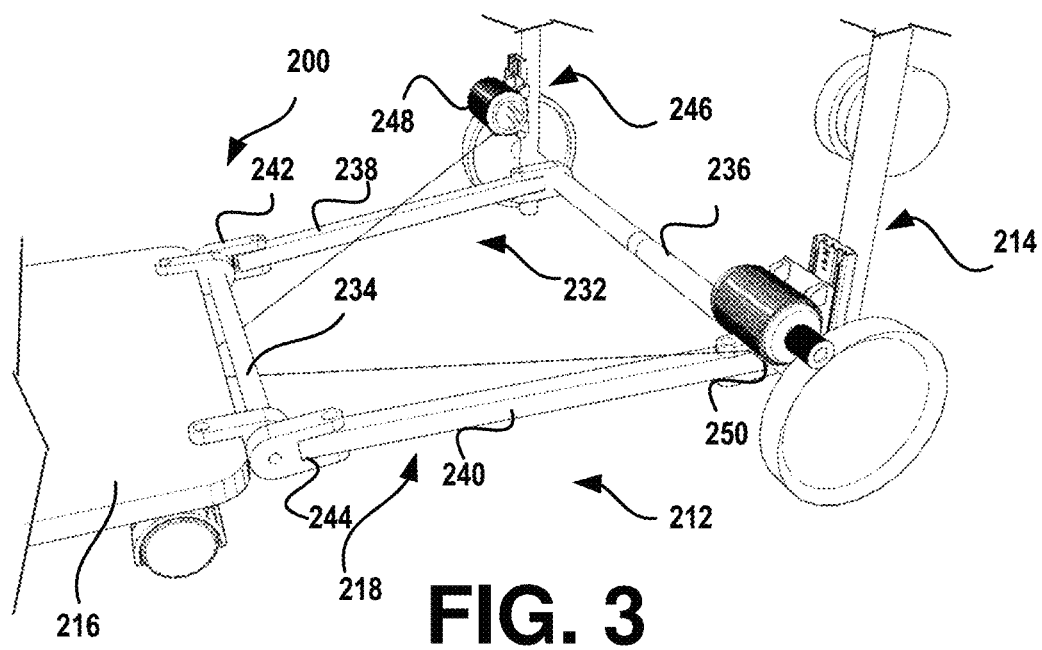
FIG. 3 is a fragmentary perspective view of a connector connecting a motorized operator platform accessory with a stroller in accordance with the present disclosure.
Figure 4:
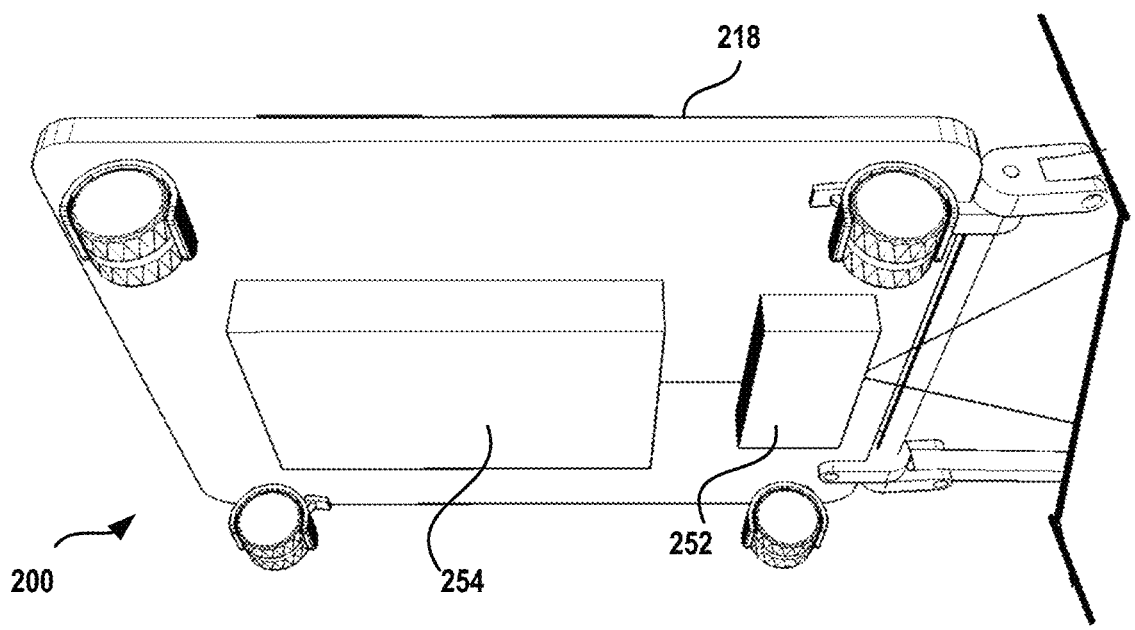
FIG. 4 is a fragmentary perspective view of the underside of a motorized operator platform in accordance with the present disclosure.

Referring now to FIGS. 2-4 with continuing reference to the foregoing figure, there is shown another embodiment of a motorized stroller accessory system, generally designated by the numeral 200. This exemplary motorized stroller accessory system 200 can transport a user/operator 210. The motorized stroller accessory system 200 includes a motorized stroller accessory 212 coupled to a stroller 214. The motorized stroller accessory 212 includes a wheeled platform 216, a connector 218, and a controller assembly 220. The connector 218 allows the motorized stroller accessory 212 to interface with the stroller 214 in order to propel said stroller 214 and user/operator 210 simultaneously.

The stroller 214 includes stroller frame 222 having multiple members 224, three or more wheels 226, and one or more housing units 228 connected to the frame 222. The frame 222 represents a structure operable to accommodate an infant (not shown) and other items (not shown), such as child care items, blankets, extra clothes, food, and the like.

The frame 222 can be comprised of any suitable material, such as steel, aluminum, plastic, fiberglass, or a combination thereof. In some embodiments, the frame 222 includes rods, hinges, axles, hand grip bar or handles 230, and a support for an underneath storage compartment. Hand grip bar or handles 230 are adjustable to accommodate the height of the operator 210 in some instances. Further, in some examples, the hand grip bar or handles 230 can support a console or a drink holder.

In some embodiments, the frame 222 can be folded for compactness. For example, the operator 210 can retract or expand the frame 222 by pushing a release button or by turning a handle or a hand grip bar to release hinged connections. In some instances, a locking mechanism can secure the frame 222 in either its compacted or expanded position. One purpose of the locking mechanism is to prevent the stroller from accidentally closing when in use.

The wheels 226 represent a component rotatably mounted within the frame 222 for rotation about one or more axes. The wheels 226 are generally circular in shape but can be any shape or size.

The housing unit 228 represents a structure operable to accommodate one or more infants. In some embodiments, the frame 222 accommodates the housing unit 228 in a forward-facing direction. In some specific embodiments, the frame 222 can adjust to accommodate a forward-facing housing unit 228 in one or more reclined positions. Additionally, the frame 222 can accommodate the housing unit 228 in a rear-facing direction, and in some particular instances the frame 222 can adjust to accommodate a rear-facing housing unit 228 in one or more reclined positions. In other embodiments, the housing unit 228 comprises a reversible seat, and frame 222 accommodates the reversible seat in both the forward-facing and rear-facing directions. Further, the frame 222 can accommodate more than one housing unit 228.

In some instances, the housing unit 228 can comprise an independent transport device that can be removed from frame 222, such as a car seat. For example, the frame 222 can provide snaps, buttons, Velcro®, or some other mechanism to secure the removable housing unit 228 in place. In some instances, the frame 222 can support the removable housing unit 228 in either a rear-facing or forward-facing direction. Additionally, the frame 222 can support more than one removable housing unit 228.

The housing unit 228 can consist of any suitable material, for example, one or more of plastic, rubber, fabric, or nylon. In some embodiments, housing unit 228 is adjustable to accommodate riders of different sizes (e.g., infant, toddler, etc.). For instance, the housing unit 228 can be comprised of components operable to expand to different sizes (e.g., fabric, Velcro®, snaps, buttons), modular components that support adding or removing portions of the housing unit 228 to increase or decrease the size (e.g., expanded polystyrene foam), or other structure or material that allows housing unit 228 to dynamically increase or decrease in size (e.g., viscoelastic polyurethane foam).

In certain embodiments, the housing unit 228 can comprise one or more different materials. For example, all or a portion of the housing unit 228 can comprise a structurally solid material (e.g., plastic, fiberglass, metal). Additionally, all or a portion of the housing unit 228 can be comprised of a flexible material (e.g. fabric). In some embodiments, the housing unit 228 includes a combination of two or more of the aforementioned materials. Different riders can benefit from different configurations. For example, small riders such as infants that require extra support can benefit from a structurally solid housing unit encased in fabric, whereas larger riders such as toddlers can benefit from an all-fabric housing unit that allows for more movement. Further, the housing unit 228 can include an adjustable 3-point or 5-point harness to secure the child to the housing unit 228. In some examples, the harness includes nylon straps, plastic buckles, and metal clips.

In some embodiments, the housing unit 228 is an enclosure. The enclosure can be adjustable by a zippers, snaps, or any other suitable fasteners. In some particular embodiments, the material covering the enclosure is transparent to provide a rider with visibility to the outside environment. Additionally, the material covering the enclosure can be opaque (e.g., cloth, flexible plastic, etc.). In other embodiments, the housing unit 228 is open to the environment. The housing unit 228 can include a sun visor or a shade to shield a rider from ultraviolet (UV) rays. Further, the housing unit 228 can be comprised of waterproof or water resistant materials. As shown in FIGS. 3-4, the connector 218 includes an essentially rectangular frame 232 formed from members 234-236 and armatures 238-240. The member 234 includes a pair of yokes 242-244 that receive the armatures 238-240. The connector 218 also includes a motor assembly 246 that has a pair of motors 248-250 that drive the stroller wheels 226. The motors 248-250 are directly connected to a control module 252 and a power supply 254 that are mounted under the wheeled platform 216.

The frame 232 can be can have an essentially isosceles trapezoidal shape to maintain horizontal rigidity. The isosceles trapezoidal shape further prevents horizontal swiveling of the platform 212 with respect to the stroller frame 222 due to torsional stress. In some cases, the frame 232 can include additional members forming an x-type cross frame or similar shoring to further to the horizontal rigidity the structure. Such additional members are especially suitable when the frame 232 has an isosceles trapezoid shape and is mounted in a manner to resemble a parallelogram.

Figure 5:
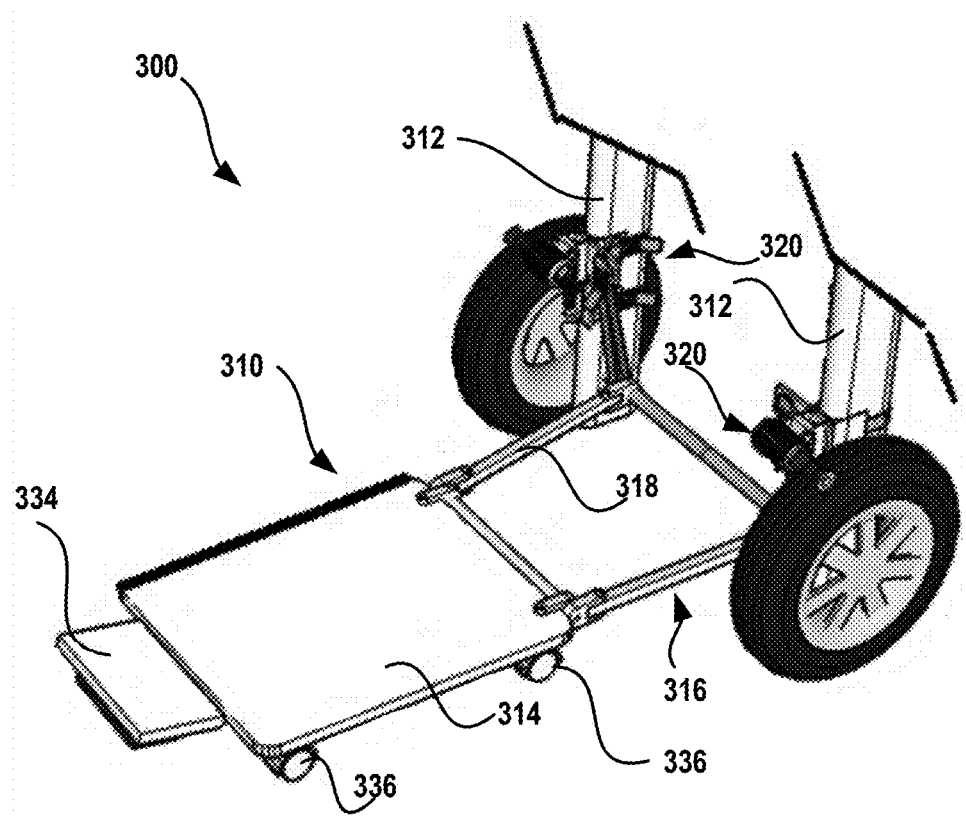
FIG. 5 is a fragmentary perspective view of another embodiment of a motorized stroller accessory system in accordance with the present disclosure.
Figure 6:
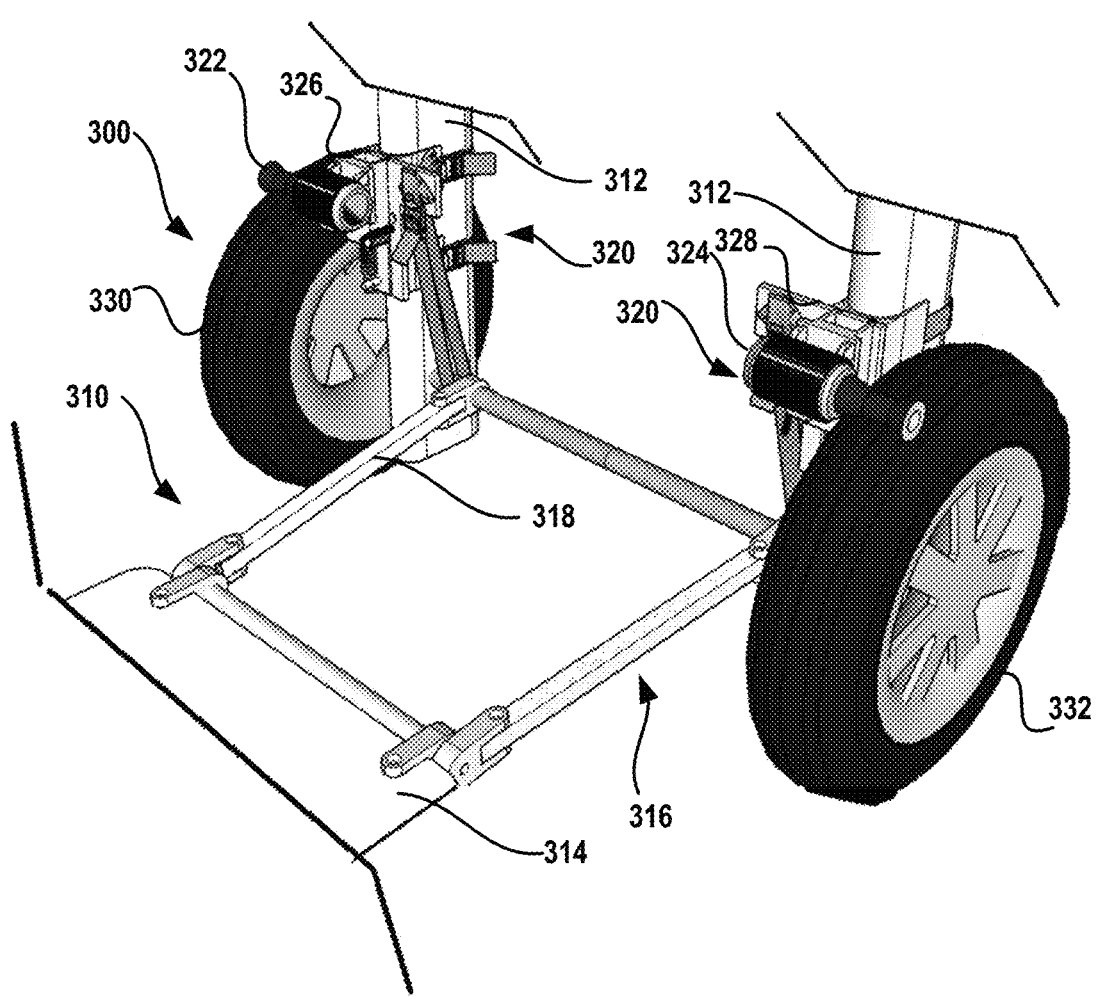
FIG. 6 is another fragmentary perspective view of the embodiment of a motorized stroller accessory system shown in FIG. 5.

Referring now to FIGS. 5-6 with continuing reference to the foregoing figures, there is shown another embodiment of a motorized stroller accessory system, generally designated by the numeral 300. This exemplary motorized stroller accessory system 300 includes a motorized stroller accessory 310 coupled to a stroller 312. The motorized stroller accessory 310 includes a wheeled platform 314 and a connector 316.

The connector 316 includes a frame 318 and a motor assembly 320. The motor assembly 320 includes a pair of motors 322-324 and a pair of mounting brackets 326-328 for attaching the motors 322-324 to the stroller 312. The motors 322-324 apply torque to drive a pair of wheels 330-332 that are mounted on the stroller 312.

Unlike the embodiments shown in FIGS. 1-4, the wheeled platform 314 includes an emergency brake 334. The emergency brake 334 represents an apparatus configurable to slow, stop, or park the motorized stroller accessory system 300. In some embodiments, the emergency brake 334 applies force directly to one or more wheels 336 mounted on the wheeled platform 314. For example, the emergency brake 334 can comprise a lever that presses a friction plate against one or more of the wheels 336.

In another embodiment, the emergency brake 334 functions by decreasing power to the motors 322-324, thus allowing the motorized stroller accessory system 300 to decelerate. Some embodiments of the motorized stroller accessory system 300 include a safety brake that automatically or manually slows or stops wheels 330-332 and/or wheels 336 in the event that a control module, such as control module 148 shown in FIG. 1 or control module 252 shown in FIG. 4, sensing a predetermined condition. The motorized stroller accessory system 300 can also include a parking brake (not shown) that prevents 330-332 and/or wheels 336 from rotating to secure the motorized stroller accessory system 300 in a stopped position.

Figure 7:
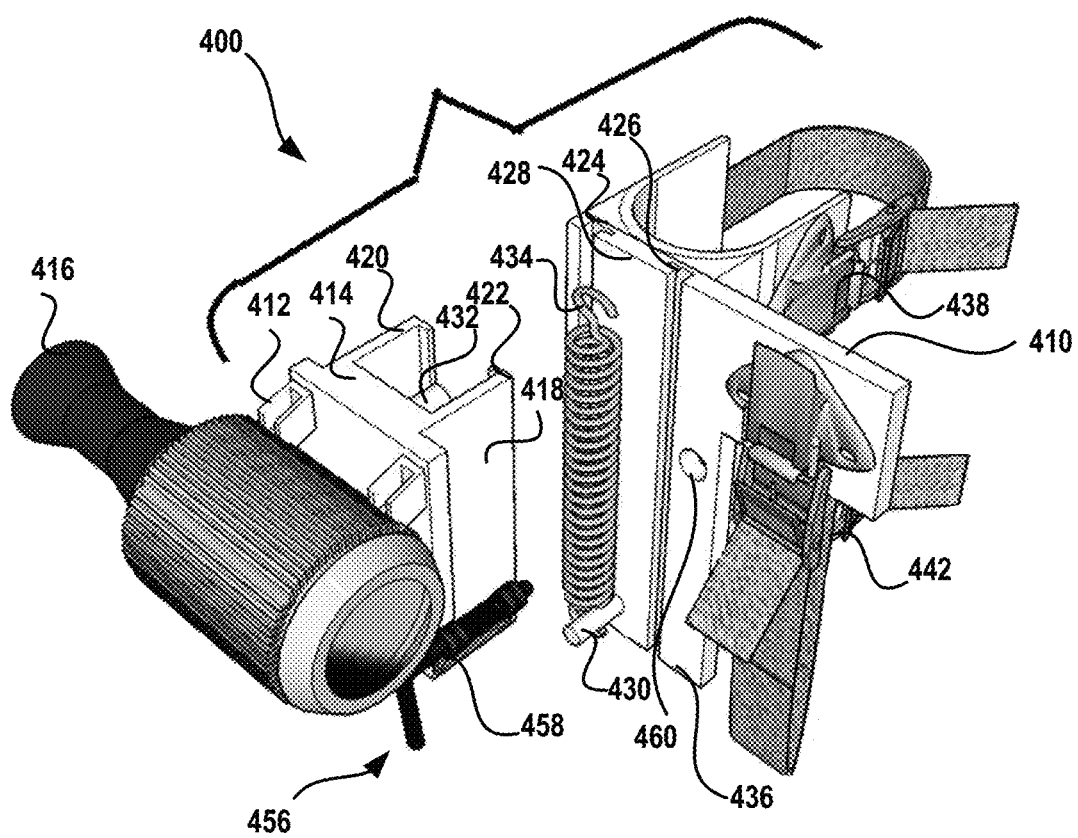
FIG. 7 is a perspective view of a connecting component for connecting a motorized operator platform accessory with a stroller in accordance with the present disclosure.
Figure 8:
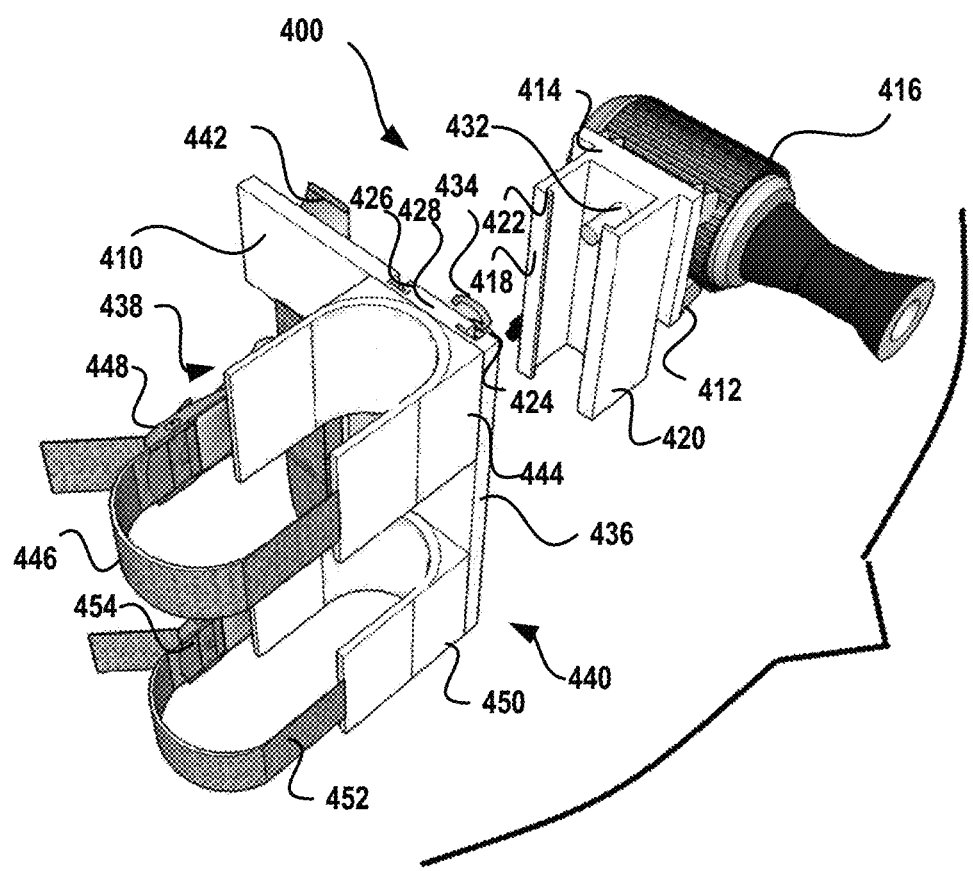
FIG. 8 is another perspective view of the connecting component shown in FIG. 7.

Referring now to FIGS. 7-8 with continuing reference to the foregoing figures, an exploded view of an exemplary mounting bracket assembly, generally designated by the numeral 400. The mounting bracket assembly 400 includes a mounting bracket component 410 and a motor bracket component 412. The motor bracket component 412 has a tubular vertical member 414 and a motor 416. In this exemplary embodiment, the mounting bracket component 410 is essentially equivalent to the mounting brackets 326-328 shown in FIG. 6. The motor component 410 includes a mating bracket 412 and a motor 414. The motor 416 is essentially identical to the motors 322-324 shown in FIG. 6.

The tubular vertical member 414 can include an integral track 418 having a pair of flanged rails 420-422. The mounting bracket component 410 includes a pair of grooves 424-426 that define a tongue 428 that slides into the track 418 to join the mounting bracket component 410 to the motor bracket component 412, releasably or removably.

A pin 430 extends from the tubular vertical member 414 and a second pin 432 extends from the tongue 428. A spring 434 can connect the pins 430-432 to spring load the motor 416 to maintain tension from a stroller and/or stroller wheels, such as the stroller 112 shown in FIG. 1, the stroller 214 shown in FIGS. 2-4, or the stroller 312 shown in FIGS. 5-6 and/or the stroller wheels 330-332 shown in FIG. 6.

The mounting bracket component 410 includes a vertical member 436 and a plurality of fastening systems 438-442 for connecting the mounting bracket component 410 to a stroller, such as the stroller 112 shown in FIG. 1, the stroller 214 shown in FIGS. 2-4, or the stroller 312 shown in FIGS. 5-6. The fastening systems 438-440 are mounted on the vertical member 436. The fastening system 438 includes a U-shaped member 444, a band 446, and a buckle 448. The fastening system 440 includes a U-shaped member 450, a band 452, and a buckle 454.

The mounting bracket assembly 400 can include a latching mechanism 456 for connecting the mounting bracket component 410 to the motor bracket component 412. The latching mechanism 456 can include a latch 458 that can be inserted, releasably, into a hole 460. The latch mechanism 456 can be activated after sliding the motor bracket component 412 up along its track on the mounting bracket component to hold it in place so that the motor sheaves are no longer in contact with the stroller wheels and the stroller can be used in a conventional manner by frictionally separating the motor 416 from a stroller wheel, such as the stroller 112 shown in FIG. 1, the stroller 214 shown in FIGS. 2-4, or the stroller 312 shown in FIGS. 5-6.

Figure 9:
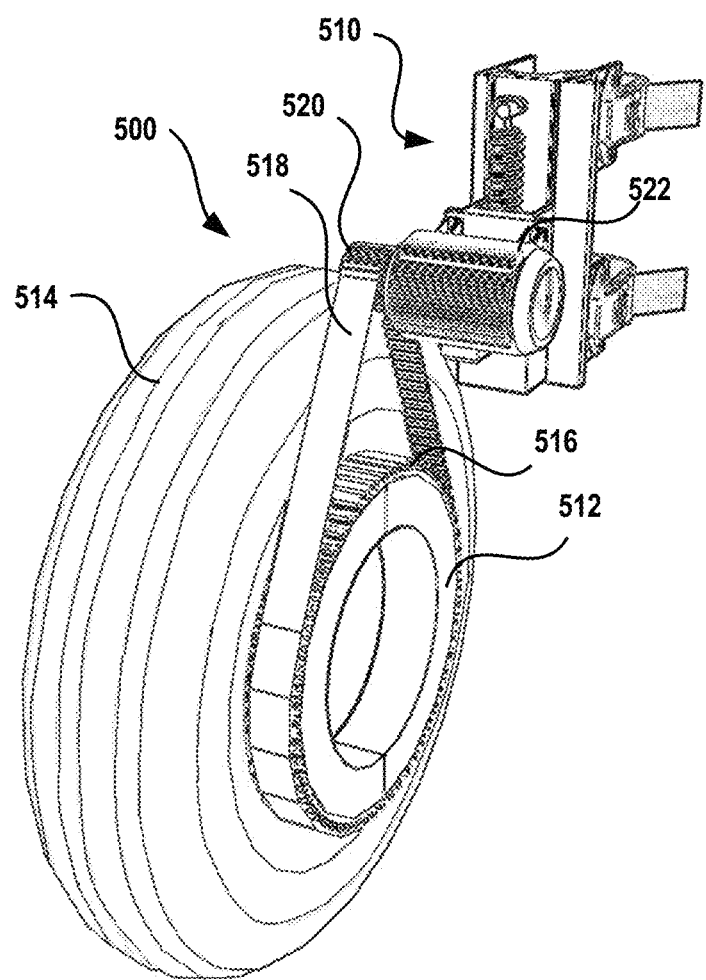
FIG. 9 is a perspective view of an alternate drive mechanism connected to a mounting bracket assembly in accordance with the present disclosure.

Referring to FIG. 9 with continuing reference to the foregoing figures, an exemplary alternate drive mechanism, generally designated by the numeral 500, is shown. The alternate drive mechanism is connected to a mounting bracket assembly 510, which is essentially equivalent to the mounting bracket assembly 400 shown in FIGS. 7-8.

In this exemplary embodiment, the drive mechanism 500 includes a sprocket wheel 512 that connects to a stroller wheel 514 having a track 516 thereon and a belt 518 that frictionally engages a member 520 that extends from a motor 522. The motor 522 can rotate the member 520 to drive the belt 518. The belt 518 rotates the sprocket wheel 512 to drive the stroller wheel 514 and transfer torque thereto.

Figure 10:
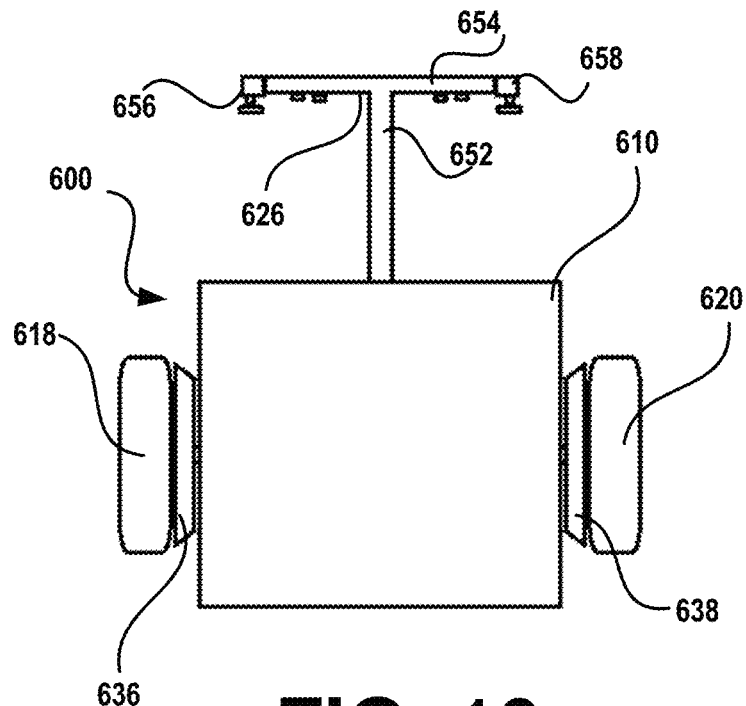
FIG. 10 is a top plan view of an alternative wheeled platform accordance with the present disclosure.
Figure 11:
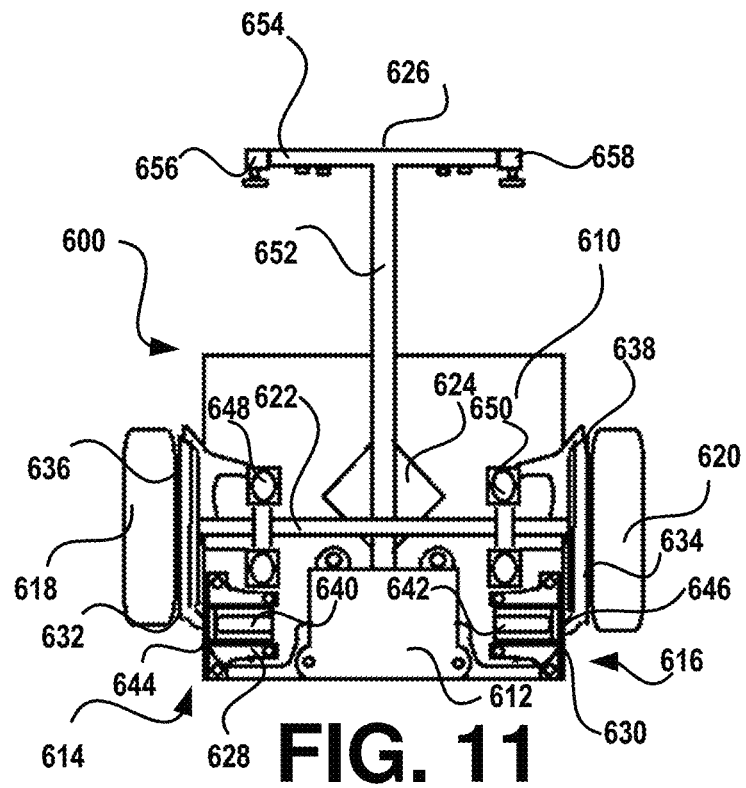
FIG. 11 is a bottom plan view of the alternative wheeled platform shown in FIG. 10 accordance with the present disclosure.

Referring to FIGS. 10-11 with continuing reference to the foregoing figures, an exemplary alternate wheeled platform, generally designated by the numeral 600, is shown. The wheeled platform 600 can be used in place of the wheeled platform 110 shown in FIG. 1. The wheeled platform 600 includes a base 610, a power supply 612, a pair of drive mechanisms 614-616, a pair of wheels 618-620, an axle 622 connecting the wheels 618-620, a turntable 624, and a connecting member assembly 626. The drive mechanisms 614-616, the wheels 618-620, and the axle 622 form a wheel assembly.

The drive mechanisms 614-616 are treaded systems that include motors 628-630, belts 632-634, and pulleys 636-638 that are connected to the wheels 618-620. The motors 628-630 include rotating cylinders 640-642 that form pulleys 644-646 on one end. The power supply 612 powers the motors 628-630 to rotate the cylinders 640-642 and the pulleys 644-646. The power supply 612 can be controlled by a remote controller (not shown).

The pulleys 644-646 pull the belts 632-634 to rotate the pulleys 636-638 to rotate the wheels 618-620. The wheels 618-620 are connected to one another with the axle 622. The axle 622 is mounted on the base 610 through a pair of downwardly extending mounts 648-650. The axle 622 extends through the mounts 648-650.

The connecting member assembly 626 includes a pair of connecting members 652-654 that form a tee. The connecting member 652 is fixably mounted on the turntable 624, so that base 610 can rotate relative to the connecting member 652 to steer the wheeled platform 600 when the wheeled platform 600 is connected to a stroller, such as the stroller 214 shown in FIG. 2. The connecting member 654 includes a pair of pin connectors 656-658 for connecting to the stroller 214.

Figure 12:
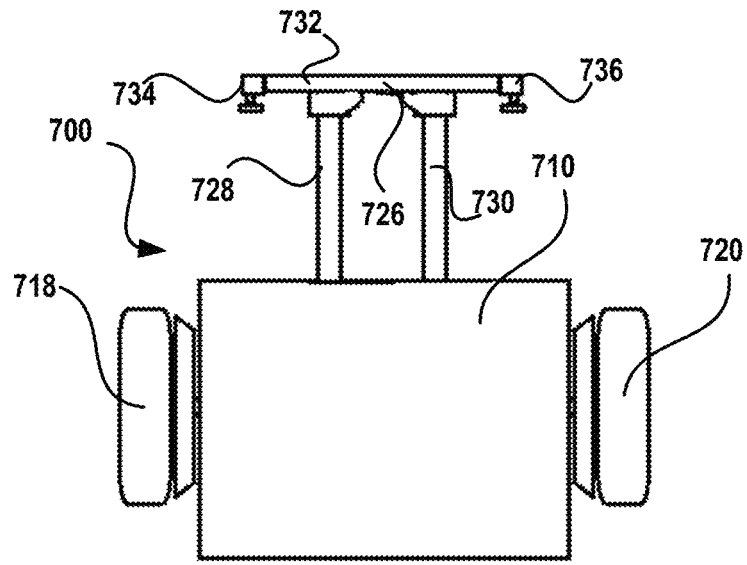
FIG. 12 is a top plan view of another alternative wheeled platform accordance with the present disclosure.
Figure 13:
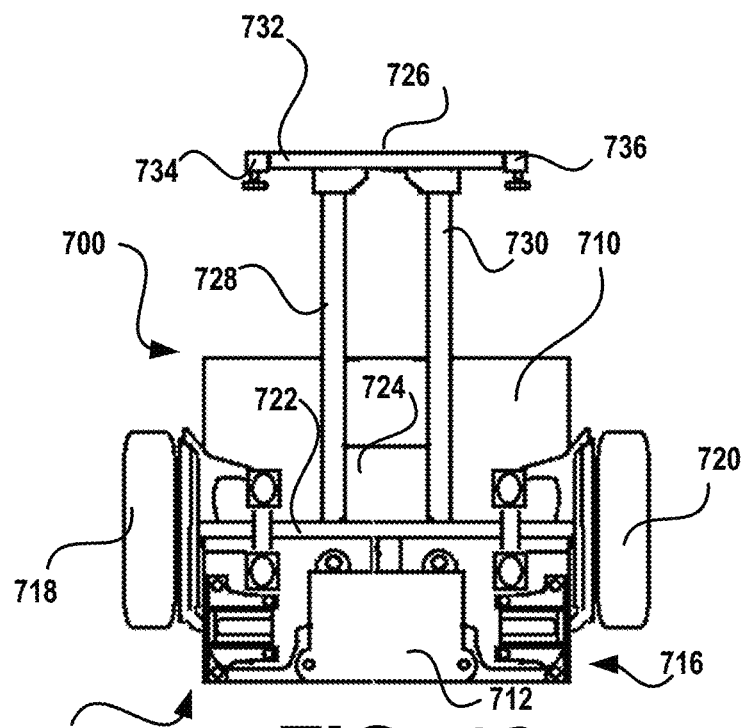
FIG. 13 is a bottom plan view of the alternative wheeled platform shown in FIG. 12 accordance with the present disclosure.

Referring to FIGS. 12-13 with continuing reference to the foregoing figures, another exemplary alternate wheeled platform, generally designated by the numeral 700, is shown. The wheeled platform 700 can be used in place of the wheeled platform 110 shown in FIG. 1. The wheeled platform 700 includes a base 710, a power supply 712, a pair of drive mechanisms 714-716, a pair of wheels 718-720, an axle 722 connecting the wheels 718-720, a turntable 724, and a connecting member assembly 726. In this exemplary embodiment, the base 710, the power supply 712, the pair of drive mechanisms 714-716, the pair of wheels 718-720, and the axle 722 function in the same manner as the base 610, the power supply 612, the pair of drive mechanisms 614-616, the pair of wheels 618-720, and the axle 622 shown in FIGS. 10-11.

Unlike the embodiment shown in FIGS. 10-11, the connecting member assembly 726 includes three connecting members 728-732 that form a truss. The connecting member 728-730 are fixably mounted on the turntable 724, so that base 710 can rotate relative to the connecting members 728-730 to steer the wheeled platform 700 when the wheeled platform 700 is connected to a stroller, such as the stroller 214 shown in FIG. 2. The connecting member 732 includes a pair of connectors 734-736 for connecting to the stroller 214.

Figure 14:
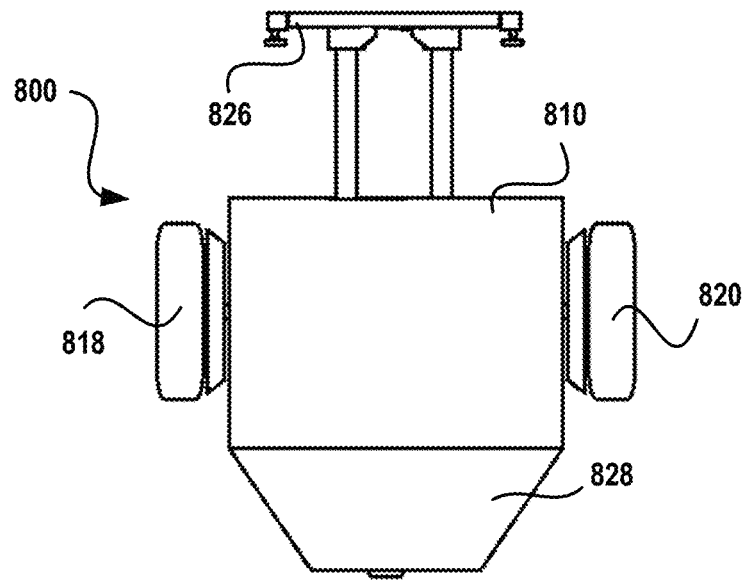
FIG. 14 is a top plan view of another alternative wheeled platform accordance with the present disclosure.
Figure 15:
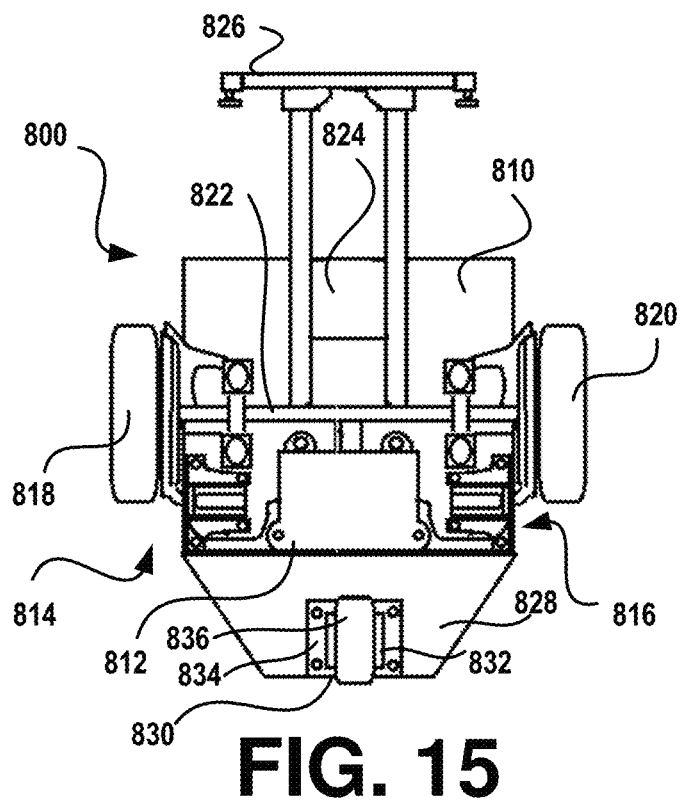
FIG. 15 is a bottom plan view of the alternative wheeled platform shown in FIG. 14 accordance with the present disclosure.

Referring to FIGS. 14-15 with continuing reference to the foregoing figures, another exemplary alternate wheeled platform, generally designated by the numeral 800, is shown. The wheeled platform 800 can be used in place of the wheeled platform 110 shown in FIG. 1. The wheeled platform 800 includes a base 810, a power supply 812, a pair of drive mechanisms 814-816, a pair of wheels 818-820, an axle 822 connecting the wheels 818-820, a turntable 824, and a connecting member assembly 826.

In this exemplary embodiment, the base 810, the power supply 812, the pair of drive mechanisms 814-816, the pair of wheels 818-820, and the axle 822 function in the same manner as the base 610, the power supply 612, the pair of drive mechanisms 614-616, the pair of wheels 618-720, and the axle 622 shown in FIGS. 10-11 or the base 710, the power supply 712, the pair of drive mechanisms 714-716, the pair of wheels 718-720, and the axle 722 shown in FIGS. 12-13. The turntable 824 and the connecting member assembly 826 function in the same manner as the turntable 724 and the connecting member assembly 726 shown in FIGS. 12-13.

Unlike the embodiments shown in FIGS. 10-11 or the embodiments shown in FIGS. 12-13, the wheeled platform 800 includes an essentially trapezoid shaped extension 828 that extends at an angle from the base 810. The extension 828 can include a wheel assembly 830 that includes a fork 832 mounted for rotation on a plate 834. The fork 832 holds an additional wheel 836.

Referring to FIGS. 16-20 with continuing reference to the foregoing figures, another exemplary alternate wheeled platform, generally designated by the numeral 900, is shown. The wheeled platform 900 can be used in place of the wheeled platform 110 shown in FIG. 1. The wheeled platform 900 includes a base 910, a controller 912, a pair of drive mechanisms 914-916, a pair of wheels 918-920, an axle 922 connecting the wheels 918-920, a turntable 924, and a connecting member assembly 926.

In this exemplary embodiment, the base 910, the pair of drive mechanisms 914-916, the pair of wheels 918-920, and the axle 922 function in the same manner as the base 610, the pair of drive mechanisms 614-616, the pair of wheels 618-720, and the axle 622 shown in FIGS. 10-11 or the base 710, the pair of drive mechanisms 714-716, the pair of wheels 718-720, and the axle 722 shown in FIGS. 12-13. The turntable 924 functions in the same manner as the turntable 724 shown in FIGS. 12-13.

Unlike the embodiments shown in FIGS. 10-15, the wheeled platform 900 includes a controller 910 that includes a housing that holds an incorporated power supply, a processor, and a gyroscopic sensor and a pair of foot straps 928-930 for receiving the feet of a user. The controller 910 can control acceleration and deceleration by pitching the wheeled platform 900. The controller 910 can have the ability to reverse the wheeled platform 900. The foot straps 928-930 are optional and can be omitted from embodiments in which a user must be able to jump off of the wheeled platform 900 rapidly and/or in an emergency.

Additionally, the wheeled platform 900 includes a vertical swiveling bracket system 932 in the connecting member assembly 926 to allow the user to pitch the wheeled platform 900 as a control input. In some embodiments, the controller 910 communicates with a handheld input device 934, which can include a joystick (not shown), to power steer a motorized stroller accessory system, such as the motorized stroller accessory system 100 shown in FIG. 1, by varying the power sent to each wheel 918-920, yawing the wheeled platform 900 as a result to change the direction of the motorized stroller accessory system.

Figure 18:
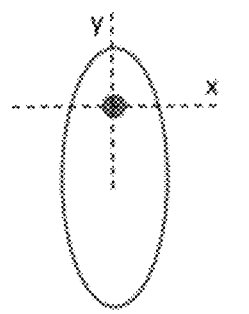
FIG. 18 is a plot illustrating an aspect of the operation of the alternative wheeled platform shown in FIG. 16 in accordance with the present disclosure.
Figure 19:
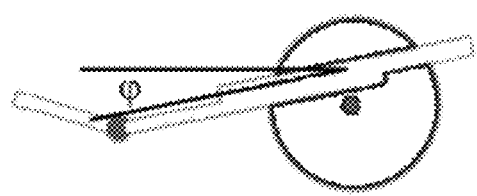
FIG. 19 is a schematic diagram illustrating an aspect of the operation of the alternative wheeled platform shown in FIG. 16 in accordance with the present disclosure.
Figure 20:
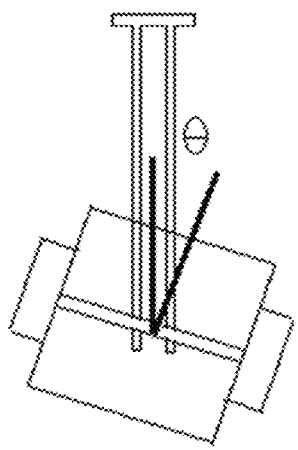
FIG. 20 is another schematic diagram illustrating an aspect of the operation of the alternative wheeled platform shown in FIG. 16 in accordance with the present disclosure.

Referring now to FIG. 18 with continuing reference to the foregoing figures, the speed and direction of the wheeled platform 900 can be controlled either by the handheld input device 934 or by gyroscopic pitch input to the controller 910. In the case of controller use for speed, the controller y axis can be used as an input to determine target speed with the following formula:

$$V_B = A^* f(b^* y)$$

where: y is the data input from the y axis of the controller; b is a scalar scaling factor for the y value; f(y) is a function of the y value, appropriately scaled; A is a scalar scaling factor for the resultant function; and $V_B$ is the target speed. The function, f(y), can be sinusoidal, linear, or any other mathematical function as deemed appropriate. The change in speed is to be controlled such that excessive positive or negative acceleration is avoided. As such, an acceleration limiter is used so that speed is not changed in excess of this rate regardless of y-axis input Referring now to FIG. 19 with continuing reference to the foregoing figures, the pitch angle can be used as an input to determine target speed when platform pitch is used to control speed with the following formulas:

$$V_B = V_{B0} + A^* f(b^* \varphi)$$

$$t_T = t_0 + T_{scale}$$

where: $\varphi$ is the data input from the platform pitch as determined by a gyroscope; b is a scalar scaling factor for the $\varphi$ value; f($\varphi$) is a function of the $\varphi$ value, appropriately scaled; A is a scalar scaling factor for the resultant function; $V_B$ is the target base speed set to be reached at the target time $t_T$; $V_{B0}$ is the instantaneous base speed; to is instantaneous time (current time); and $t_T$ is the target time, and is always in the future by an amount equal to $T_{scale}$.

The function, f($\varphi$), can be sinusoidal, linear, or any other mathematical function as deemed appropriate. The use of this function causes the system to add speed (accelerate) when the value of $\varphi$ is positive (i.e. pitching forward), reduce speed when $\varphi$ is negative, and maintain constant speed when $\varphi$ is zero and the platform is level.

The difference between $V_B$ and $V_{B0}$, along with the value of $T_{scale}$ determine the amount of positive and negative acceleration felt by the system occupants. The change in speed is to be controlled such that excessive positive or negative acceleration is avoided. As such, an acceleration limiter is used so that speed is not changed in excess of this rate regardless of $\varphi$ input Referring now to FIG. 20 with continuing reference to the foregoing figures, platform yaw is determined by a properly-calibrated sensor that is used in combination with the controller x-axis to calculate the left and right motor speeds.

This maintains the required yaw as determined by the controller x-position and the following formulas:

$$V_R = V_{B0} + A*f(c*x*f(V_{B0}) - d*\theta)$$

$$V_L = V_{B0} - A*f(c*x*f(V_{B0}) - d*\theta)$$

where: A,c, and d are all constant scaling factors; $f(x,\theta,V_{B0})$ is a function of $x,\theta,$ and $V_{B0}$; $V_{B0}$ is the instantaneous speed, which is the average of the right and left speeds; the function $f(V_{B0})$ is an inversely proportional calculation of $V_{B0}$ such that at higher speeds the x-controller input is scaled down in order to achieve better control, more stability and wider turns; and $V_R$ and $V_L$ are the target speeds for the right and left motors respectively.

The function, $f(x,\theta,V_{B0})$, can be sinusoidal, linear, or any other mathematical function as deemed appropriate. The function, $f(V_{B0})$, can be linear, quadratic, polynomial, logarithmic, exponential, sinusoidal, or any other type as deemed appropriate.

The speeds $V_R$ and $V_L$ are different during transients when there is a change in the controller x-axis input or yaw deflection θ such that $c*x*f(V_{B0})$ does not equal $d*\theta$. The difference in left/right speed causes the platform to yaw until $c*x*f(V_{B0}) = d*\theta$, at which point $f(x,\theta,V_{B0})$ equals zero, $V_R = V_L = V_{B0}$, and the platform yaw angle remains at θ until a different x-axis input is sent from the handheld controller.

Figure 21:
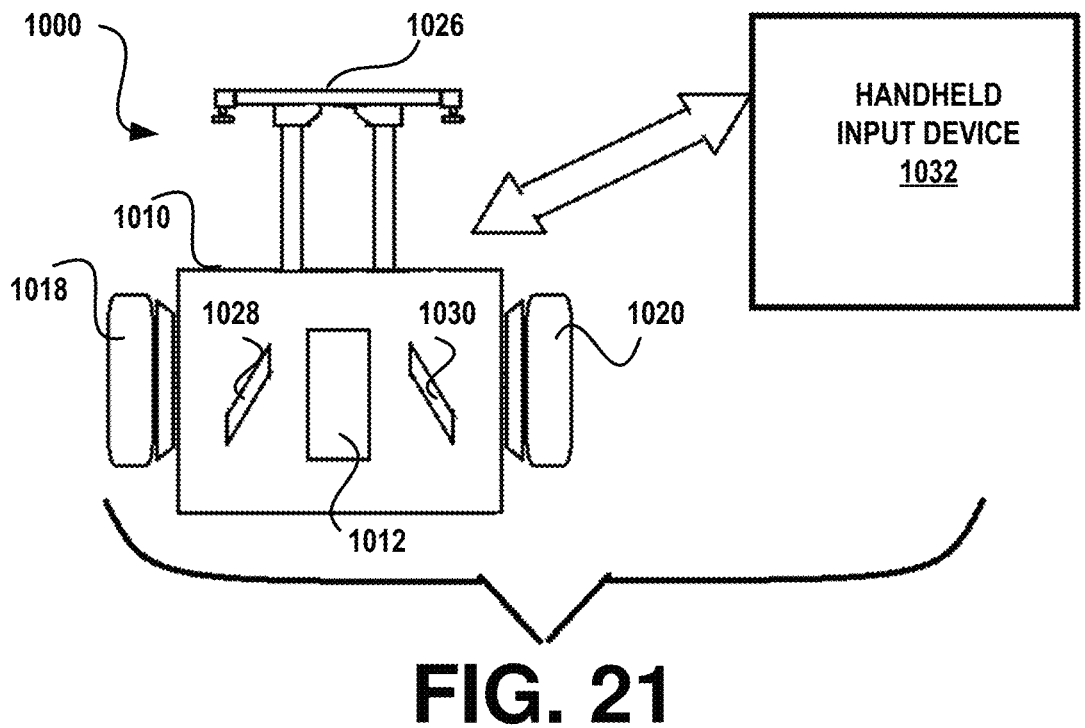
FIG. 21 is a top plan view of another alternative wheeled platform accordance with the present disclosure.
Figure 22:
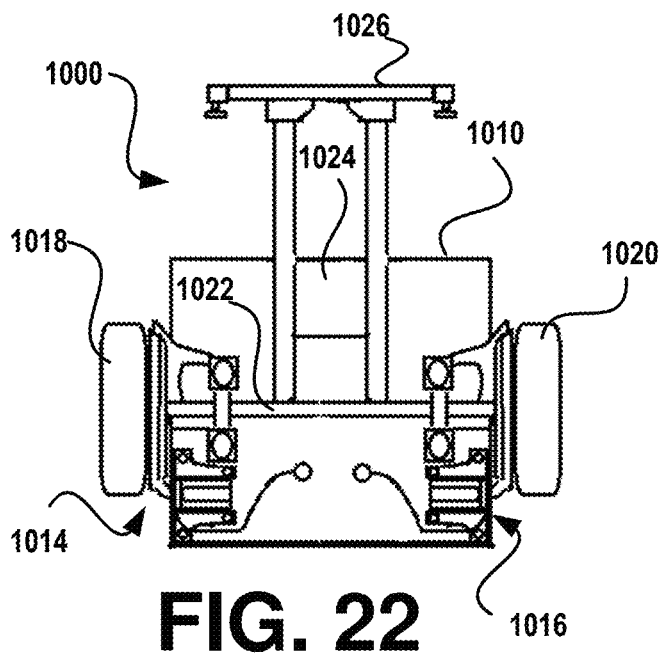
FIG. 22 is a bottom plan view of the alternative wheeled platform shown in FIG. 21 accordance with the present disclosure.

Referring to FIGS. 21-22 with continuing reference to the foregoing figures, another exemplary alternate wheeled platform, generally designated by the numeral 1000, is shown. The wheeled platform 1000 can be used in place of the wheeled platform 110 shown in FIG. 1. The wheeled platform 1000 includes a base 1010, a controller 1012, a pair of drive mechanisms 1014-1016, a pair of wheels 1018-1020, an axle 1022 connecting the wheels 1018-1020, a turntable 1024, a connecting member assembly 1026, and a pair of foot straps 1028-1030.

In this exemplary embodiment, the base 1010, the pair of drive mechanisms 1014-1016, the pair of wheels 1018-1020, and the axle 1022 function in the same manner as the base 610, the pair of drive mechanisms 614-616, the pair of wheels 618-720, and the axle 622 shown in FIGS. 10-11 or the base 710, the pair of drive mechanisms 714-716, the pair of wheels 718-720, and the axle 722 shown in FIGS. 12-13.

The controller 1012 functions in the same manner as the controller 912 shown in FIGS. 16-20. The turntable 1024 functions in the same manner as the turntable 724 shown in FIGS. 12-13. The controller 1012 can communicate with a handheld input device 1032 that functions in the same manner as the handheld input device 934 shown in FIGS. 16-20. The foot straps 1028-1030 functions in the same manner as the foot straps 930-932 shown in FIGS. 16-20.

Figure 16:
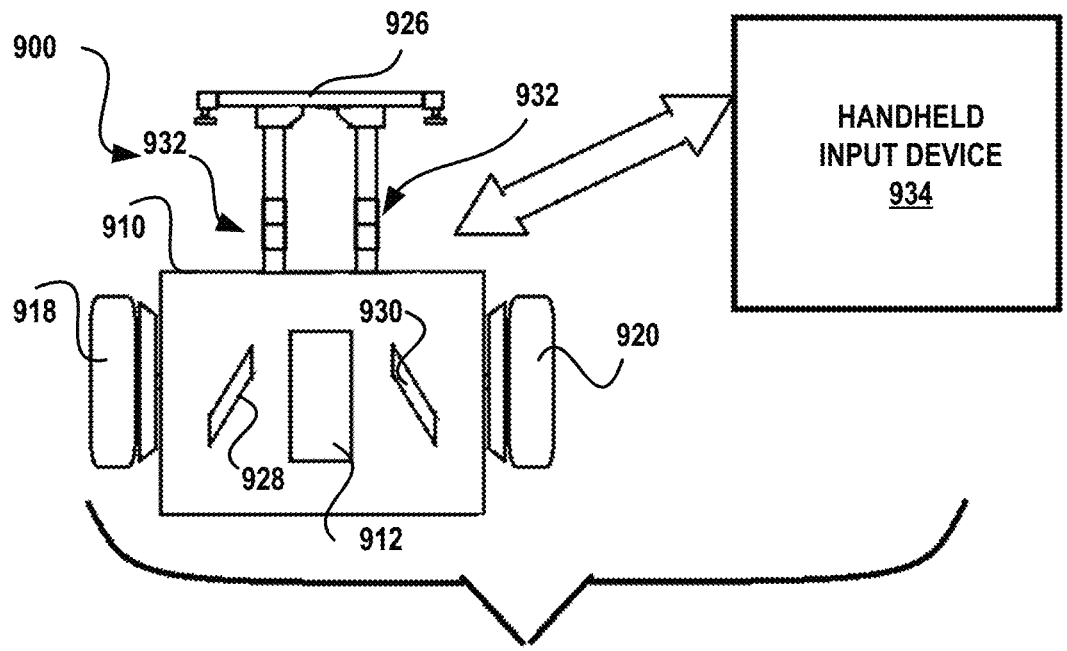
FIG. 16 is a top plan view of another alternative wheeled platform accordance with the present disclosure.
Figure 17:
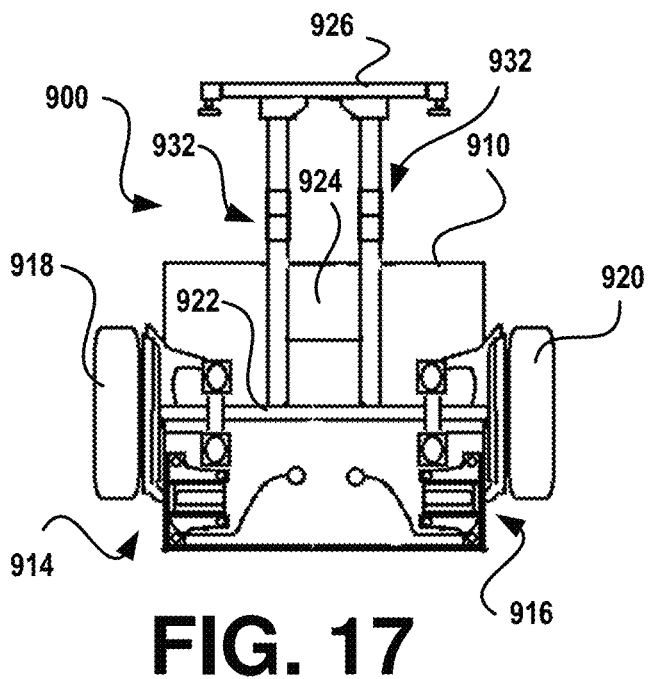
FIG. 17 is a bottom plan view of the alternative wheeled platform shown in FIG. 16 accordance with the present disclosure.

Unlike the embodiment shown in FIGS. 16-17, connecting member assembly 1026 does not include a vertical swiveling bracket system, such as the vertical swiveling bracket system 932 shown in FIGS. 16-17 (i.e., the brackets are fixed without pitch control). In this exemplary embodiment, a handheld input device 1032 and the controller 1010 can have a joystick (not shown) with two axis control. The x-axis can control steering by sending differential power to the wheels 1018-1020. The y-axis can control speed.

Figure 23:
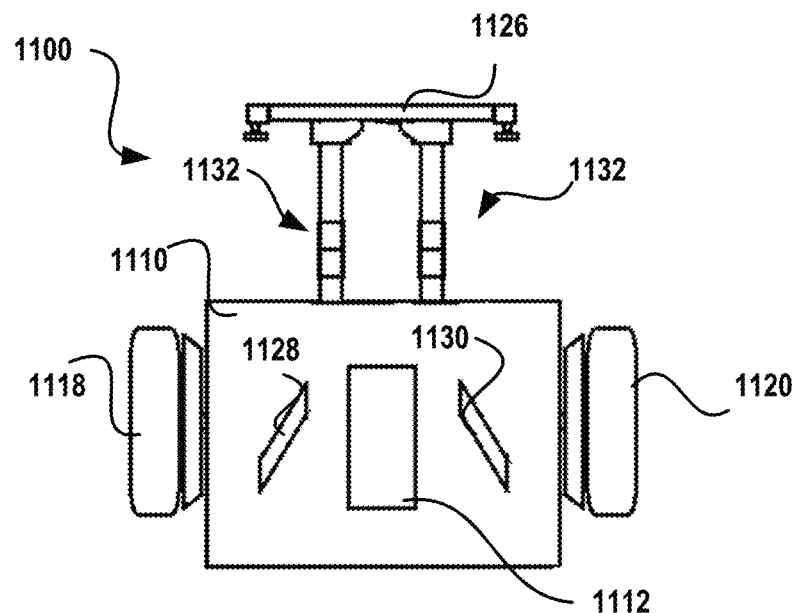
FIG. 23 is a top plan view of another alternative wheeled platform accordance with the present disclosure.
Figure 24:
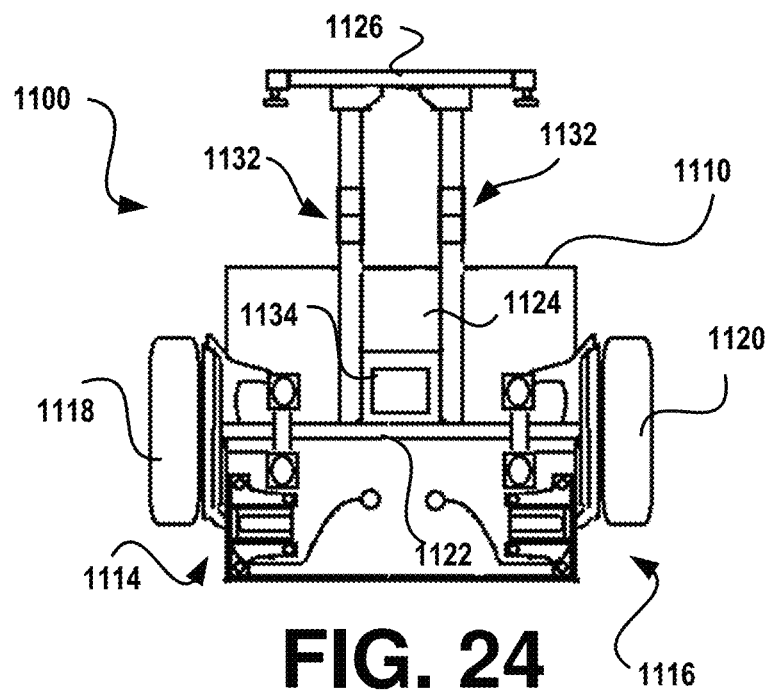
FIG. 24 is a bottom plan view of the alternative wheeled platform shown in FIG. 23 accordance with the present disclosure.

Referring to FIGS. 23-24 with continuing reference to the foregoing figures, another exemplary alternate wheeled platform, generally designated by the numeral 1100, is shown. The wheeled platform 1100 can be used in place of the wheeled platform 110 shown in FIG. 1. The wheeled platform 1100 includes a base 1110, a controller 1112, a pair of drive mechanisms 1114-1116, a pair of wheels 1118-1120, an axle 1122 connecting the wheels 1118-1120, a turntable 1124, a connecting member assembly 1126, and a pair of foot straps 1128-1130.

In this exemplary embodiment, the base 1110, the pair of drive mechanisms 1114-1116, the pair of wheels 1118-1120, and the axle 1122 function in the same manner as the base 610, the pair of drive mechanisms 614-616, the pair of wheels 618-720, and the axle 622 shown in FIGS. 10-11 or the base 710, the pair of drive mechanisms 714-716, the pair of wheels 718-720, and the axle 722 shown in FIGS. 12-13. The turntable 1124 functions in the same manner as the turntable 724 shown in FIGS. 12-13 The foot straps 1128-1130 functions in the same manner as the foot straps 930-932 shown in FIGS. 16-20.

Unlike the embodiment shown in FIGS. 21-22, connecting member assembly 1126 includes a vertical swiveling bracket system 1132 that is similar to the vertical swiveling bracket system 932 shown in FIGS. 16-20. The wheeled platform 1100 also includes an electromechanical controller assembly 1134 having worm gear-driven mechanical stops. The electromechanical controller assembly 1134 limits the yawing of the wheel platform 1100 at high speed for stability.

Figure 25:
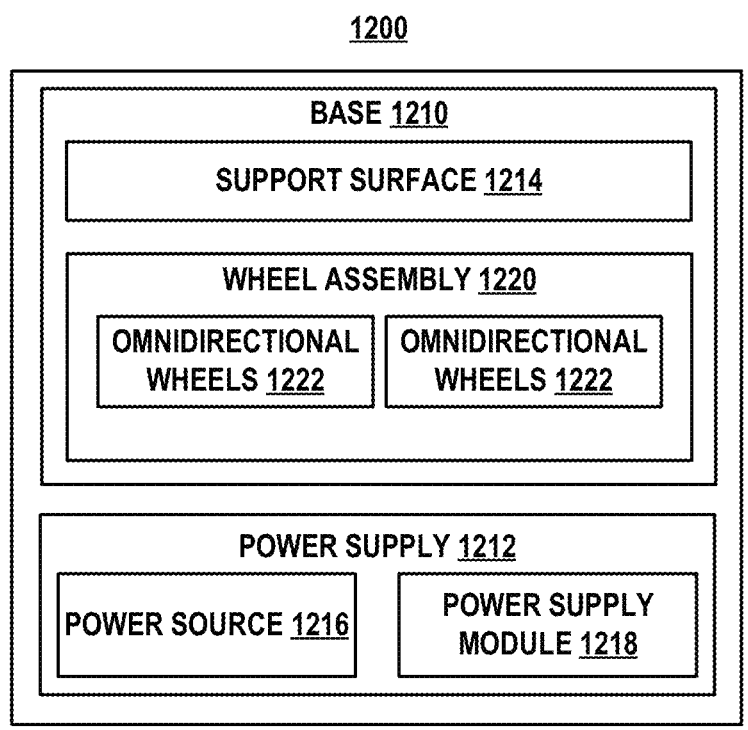
FIG. 25 is a block diagram of another alternative wheeled platform accordance with the present disclosure.

Referring to FIG. 25 with continuing reference to the foregoing figures, another exemplary alternate wheeled platform, generally designated by the numeral 1200, is shown. The wheeled platform 1200 can be used in place of the wheeled platform 110 shown in FIG. 1. The wheeled platform 1200 includes a base 1210, power supply 1212, a support surface 1214, power source 1216, and power supply module 1218 that perform essentially the same or similar functions to the base 120, power supply 124, support surface 126, power source 144, and power supply module 146 shown in FIG. 1.

Unlike the embodiment shown in FIG. 1, the wheeled platform 1200 includes a wheel assembly 1220 that includes a set of omnidirectional wheels 1222-1224. The omnidirectional wheels 1222-1224 can be Omni wheels, poly wheels, or Mecanum wheels. In this exemplary embodiment, the omnidirectional wheels 1222-1224 provide a driving force that can complement or replace the driving force provided by the motor 140 shown in FIG. 1. The omnidirectional wheels 1222-1224 provide the wheeled platform 1200 with the ability to move in all directions.

The omnidirectional wheels 1222-1224 can be oriented on either side of the wheeled platform 1200 oriented parallel to rear stroller wheels, such as the wheels 226 shown in FIG. 2. In such embodiments, the omnidirectional wheels 1222-1224 provide forwards and backwards force on either side independently while still allowing sideways sliding of the wheeled platform 1200 during turning.

Omnidirectional wheels can be mounted in conventional application to be driven four at a time at a 45 degree angle to allow force vectoring in all directions. In this exemplary embodiment, the omnidirectional wheels 1222-1224 are mounted in parallel to allow for sideways movement and/or forward/backward force. In embodiments that include Mecanum wheels, the omnidirectional wheels 1222-1224 can provide sideways strafing forces as well as front-to-back forces.

Figure 26:
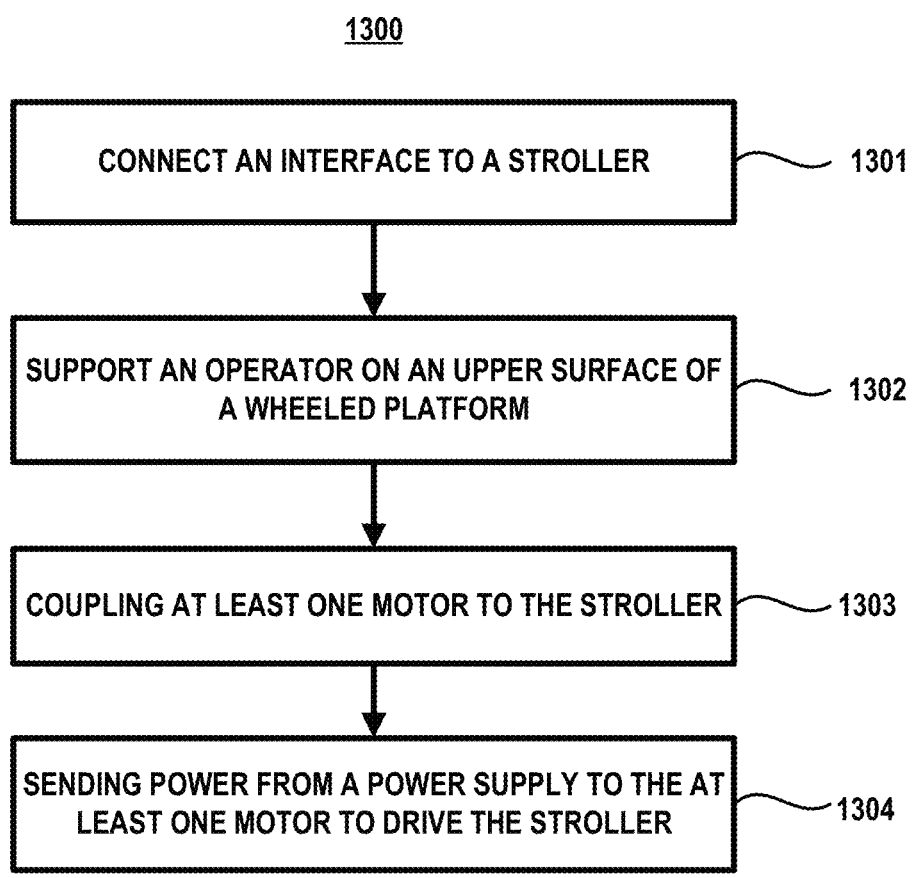
FIG. 26 is an exemplary process in accordance with the present disclosure.

Referring to FIG. 26 with continuing reference to the foregoing figures, a method 1000 for operating a motorized stroller accessory system in accordance with the described subject matter is shown. Method 1300, or portions thereof, can be performed using the various embodiments of a motorized stroller accessory system, such as the motorized stroller accessory systems 100,200,and 300, shown in FIGS. 1-6.

At 1301, an interface is connected to a stroller. In this exemplary embodiment, the interface is a connector, such as the connector 116 shown in FIG. 1, the connector 218 shown in FIGS. 2-4, or the connector 316 shown in FIGS. 5-6. The connector can connect to a stroller, such as stroller 112 shown in FIG. 1, the stroller 214 shown in FIGS. 2-4, or the stroller 312 shown in FIGS. 5-6.

At 1302, an operator is supported on an upper surface of a wheeled platform. In this exemplary embodiment, the wheeled platform can be the wheeled platform 114 shown in FIG. 1, the wheeled platform 216 shown in FIGS. 2-4, or the wheeled platform 314 shown in FIGS. 5-6. The upper surface can be the upper surface 126 shown in FIG. 1.

At 1303, at least one motor is coupled to the stroller. In this exemplary embodiment, the motor can be the motor 140 shown in FIG. 1, the motors 248-250 shown in FIGS. 2-4, the motors 322-324 shown in FIGS. 5-6, or the motor 416 shown in FIGS. 7-8. The stroller can be the stroller 112 shown in FIG. 1, the stroller 214 shown in FIGS. 2-4, or the stroller 312 shown in FIGS. 5-6.

At 1304, power is sent from a power supply to the at least one motor to drive the stroller. In this exemplary embodiment, the power supply can be the power supply 124 shown in FIG. 1 or the power supply 254 shown in FIG. 4. The motor can be the motor 140 shown in FIG. 1, the motors 248-250 shown in FIGS. 2-4, the motors 322-324 shown in FIGS. 5-6, or the motor 416 shown in FIGS. 7-8. The stroller can be driven by the drive mechanism 500 shown in FIG. 9 or any other suitable drive mechanism.

It should be understood that the wheeled platform/stroller system can be steered by making the motors rotate at different speeds causing the rear stroller wheels to rotate at different rates and/or indifferent directions. This operation can be controlled by independent motor controls accessible to the operator.

Supported Features and Embodiments

The detailed description provided above in connection with the appended drawings explicitly describes and supports various features of a motorized accessory that aids in propelling, stopping and steering the stroller while simultaneously carrying an operator. By way of illustration and not limitation, supported embodiments include an apparatus for interfacing with a stroller, the apparatus comprising: a wheeled platform having a base, a plurality of wheels, and a power supply, a connector extending from the wheeled platform, a motor assembly having at least one motor mounted on the connector to couple with the stroller, and a controller assembly for steering the stroller, wherein the base includes an upper surface for supporting an operator, wherein the base forms a wheel assembly for holding the wheels, and wherein the power supply sends power to the motor assembly through the control assembly to drive the stroller.

Supported embodiments include the foregoing apparatus, wherein the power supply sends power to the motor assembly through the control assembly to steer the stroller.

Supported embodiments include any of the foregoing apparatuses, wherein the plurality of wheels are mounted within the wheel assembly to swivel.

Supported embodiments include any of the foregoing apparatuses, wherein the base upper surface includes a coating having a high coefficient of friction to engage the operator frictionally.

Supported embodiments include any of the foregoing apparatuses, wherein the connector includes rigid armature.

Supported embodiments include any of the foregoing apparatuses, wherein the rigid armature is mounted within the connector for movement in a vertical direction.

Supported embodiments include any of the foregoing apparatuses, wherein the rigid armature cannot move in the horizontal direction.

Supported embodiments include any of the foregoing apparatuses, wherein the rigid armature is mounted within the connector for movement in a horizontal direction.

Supported embodiments include any of the foregoing apparatuses, wherein the stroller includes a bottom basket and the armature can be stored therein.

Supported embodiments include any of the foregoing apparatuses, wherein the power supply includes a power supply module mounted under the base.

Supported embodiments include any of the foregoing apparatuses, wherein the controller assembly includes a control module positioned under the base.

Supported embodiments include any of the foregoing apparatuses, wherein the motor is a DC motor.

Supported embodiments include any of the foregoing apparatuses, wherein the motor assembly includes a plurality of independently-controlled DC motors.

Supported embodiments include any of the foregoing apparatuses, wherein the DC motors are connected to a control module within the controller assembly.

Supported embodiments include any of the foregoing apparatuses, wherein the controller assembly includes a pair of hand-held controls.

Supported embodiments include any of the foregoing apparatuses, wherein the pair of hand-held controls communicates with the control module wirelessly.

Supported embodiments include any of the foregoing apparatuses, wherein the pair of hand-held controls are connected to the control module for communication.

Supported embodiments include any of the foregoing apparatuses, wherein the DC motors are mounted on tracks.

Supported embodiments include any of the foregoing apparatuses, wherein the stroller includes a frame and the tracks are coupled on the frame.

Supported embodiments include any of the foregoing apparatuses, wherein: the motor assembly includes a plurality of DC motors, and the tracks are spring loaded to maintain tension from one or more rear wheels extending from the stroller.

Supported embodiments include any of the foregoing apparatuses, wherein: the motor assembly includes a latch, and the tracks allow for the motors to be disengaged from the stroller by activating the latch.

Supported embodiments include any of the foregoing apparatuses, wherein the motor includes at least one motor shaft connected to sheaves selected from the group consisting of small radius flat sheaves and curved sheaves, and the sheaves are coated with a material having a high coefficient of friction.

Supported embodiments include any of the foregoing apparatuses, wherein the plurality of wheels includes at least one omnidirectional wheel.

Supported embodiments include a system, a method, a kit, and/or means for implementing any of the foregoing apparatuses or a portion thereof.

Supported embodiments include a method for operating a wheeled platform having an interface extending therefrom, the method comprising: connecting the interface to a stroller, supporting an operator on an upper surface of the wheeled platform, coupling at least one motor to the stroller, and sending power from a power supply to the at least one motor to drive the stroller.

Supported embodiments include the foregoing method, further comprising: swiveling the plurality of wheels.

Supported embodiments include any of the foregoing methods, further comprising: controlling power supply, the at least one motor, and the wheel assembly with a hand-held controller.

Supported embodiments include any of the foregoing methods, wherein the hand-held controller communicates with the control module wirelessly.

Supported embodiments include any of the foregoing methods, further comprising: sending power from a power supply to the at least one motor to steer the stroller.

Supported embodiments include a system, an apparatus, a kit, and/or means for implementing any of the foregoing methods or a portion thereof.

Supported embodiments include an apparatus for interfacing with a stroller, the apparatus comprising: supporting means for supporting an operator, connecting means for connecting the supporting means to the stroller, driving means for driving the stroller, powering means for powering the driving means, and controlling means for steering the stroller, wherein driving means are mounted on connecting means to couple with the stroller.

Supported embodiments include a system, a method, a kit, and/or means for implementing the foregoing apparatus or a portion thereof.

Supported embodiments include a kit comprising: a wheeled platform having a base, a plurality of wheels, and a power supply, a connector for connecting to and extending from the wheeled platform, a motor assembly having at least one motor for mounting on the connector to couple with a stroller, and a controller assembly coupling with the wheeled platform, wherein the base includes an upper surface for supporting an operator, and wherein the base forms a wheel assembly for holding the wheels.

Supported embodiments include a system, a method, an apparatus, and/or means for implementing the foregoing kit or a portion thereof.

Supported embodiments include an apparatus for interfacing with a stroller, the apparatus comprising: a wheeled platform having a base, a plurality of wheels, and a power supply, a connector extending from the wheeled platform, and a controller assembly for steering the stroller, wherein the base includes an upper surface for supporting an operator, wherein the base forms a wheel assembly for holding the wheels, and wherein the plurality of wheels includes at least one omnidirectional wheel to drive the stroller.

Supported embodiments include a system, a method, a kit, and/or means for implementing the foregoing apparatus or a portion thereof.

Supported embodiments include a wheeled platform for use within a motorized stroller accessory, the wheeled platform comprising: a base for supporting an operator, a wheel assembly having a drive mechanism for driving the wheeled platform, and a power supply for powering the drive mechanism.

Supported embodiments include the foregoing wheeled platform, further comprising: a connecting member assembly for connecting to a stroller.

Supported embodiments include any of the foregoing wheeled platforms, further comprising: a turntable connecting the connecting member assembly to the base.

Supported embodiments include any of the foregoing wheeled platforms, wherein the connecting member assembly includes a plurality of connecting members that form a truss.

Supported embodiments include any of the foregoing wheeled platforms, wherein the wheel assembly includes at least one omnidirectional wheel.

Supported embodiments include any of the foregoing wheeled platforms, wherein the drive mechanism includes a plurality of wheels, a plurality of pulleys, and a pair of belts.

Supported embodiments include any of the foregoing wheeled platforms, further comprising: an extension having a fork pivotally mounted thereon and an additional wheel mounted for rotation in the fork.

Supported embodiments include any of the foregoing wheeled platforms, further comprising: a controller having a gyroscopic sensor therein.

Supported embodiments include any of the foregoing wheeled platforms, wherein the controller can control the movement of the wheeled platform.

Supported embodiments include any of the foregoing wheeled platforms, wherein connecting member assembly includes a vertical swiveling bracket system.

Supported embodiments include any of the foregoing wheeled platforms, further comprising a handheld input device for communicating with the controller to instruct the controller to control the movement of the wheeled platform.

Supported embodiments include any of the foregoing wheeled platforms, further comprising: an electromechanical controller assembly having worm gear-driven mechanical stops to limit the yawing of the wheeled platform.

Supported embodiments include an apparatus, a system, a method, a kit, and/or means for implementing the foregoing wheeled platform or a portion thereof.

Supported embodiments can provide various attendant and/or technical advantages in terms of improved efficiency and/or savings with respect to a system that is configured to interface with a stroller in order to propel said stroller and operator simultaneously. Further, the system has the ability to safely slow down or stop the stroller and operator.

Supported embodiments include a system with the ability to turn the stroller and/or with the ability to propel the stroller in reverse. Further, supported embodiments include a system that aids in transporting the stroller operator and occupant without causing physical exertion or fatigue to either.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A wheeled platform for use within a motorized stroller accessory, the wheeled platform comprising:
   a base for supporting an operator,
   a wheel assembly having a drive mechanism for driving the wheeled platform,
   a power supply for powering the drive mechanism, and
   an extension having a fork pivotally mounted thereon and an additional wheel mounted for rotation in the fork.

2. The wheeled platform of claim 1, further comprising:
   a connecting member assembly for connecting to a stroller.

3. The wheeled platform of claim 2, further comprising:
   a turntable connecting the connecting member assembly to the base.

4. The wheeled platform of claim 2, wherein the connecting member assembly includes a plurality of connecting members that form a truss.

5. The wheeled platform of claim 1, wherein the drive mechanism includes a plurality of wheels, a plurality of pulleys, and a pair of flexible members selected from the group consisting of belts and chains.

6. A wheeled platform for use within a motorized stroller accessory, the wheeled platform comprising:
   a base for supporting an operator,
   a wheel assembly having a drive mechanism for driving the wheeled platform,
   a power supply for powering the drive mechanism, and
   a controller having a gyroscopic sensor therein,
   wherein the controller can control the movement of the wheeled platform.

7. The wheeled platform of claim 6, wherein connecting member assembly includes a vertical swiveling bracket system.

8. The wheeled platform of claim 7, further comprising:
   a handheld input device for communicating with the controller to instruct the controller to control the movement of the wheeled platform.

9. The wheeled platform of claim 6, further comprising:
   an electromechanical controller assembly having worm gear-driven mechanical stops to limit the yawing of the wheeled platform.

10. The wheeled platform of claim 6, further comprising:
    a connecting member assembly for connecting to a stroller.

11. The wheeled platform of claim 10, further comprising:
    a turntable connecting the connecting member assembly to the base.

12. The wheeled platform of claim 10, wherein the connecting member assembly includes a plurality of connecting members that form a truss.

13. The wheeled platform of claim 10, wherein connecting member assembly includes a vertical swiveling bracket system.

14. The wheeled platform of claim 13, further comprising:
    a handheld input device for communicating with the controller to instruct the controller to control the movement of the wheeled platform.

15. The wheeled platform of claim 10, further comprising:
    an electromechanical controller assembly having worm gear-driven mechanical stops to limit the yawing of the wheeled platform.

16. The wheeled platform of claim 6, wherein the drive mechanism includes a plurality of wheels, a plurality of pulleys, and a pair of flexible members selected from the group consisting of belts and chains.

17. A method for operating a wheeled platform having an interface extending therefrom, the method comprising:
    connecting the interface to a stroller,
    supporting an operator on an upper surface of the wheeled platform having a power supply, a plurality of wheels, and a motor coupled to the plurality of wheels, and
    sending power from a power supply to the motor to drive the wheels and the stroller and to steer the stroller.

18. The method of claim 17, further comprising:
    swiveling the plurality of wheels.

19. The method of claim 17, further comprising:
    controlling power supply, the at least one motor, and the wheel assembly with a hand-held controller.

20. The method of claim 19, wherein the hand-held controller communicates with the control module wirelessly.

* * * * *